(12) United States Patent
Srinivasan et al.

(10) Patent No.: US 7,242,713 B2
(45) Date of Patent: Jul. 10, 2007

(54) 2-D TRANSFORMS FOR IMAGE AND VIDEO CODING

(75) Inventors: Sridhar Srinivasan, Seattle, WA (US); Shankar Regunathan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 875 days.

(21) Appl. No.: 10/376,147

(22) Filed: Feb. 28, 2003

(65) Prior Publication Data

US 2003/0206582 A1 Nov. 6, 2003

Related U.S. Application Data

(60) Provisional application No. 60/377,298, filed on May 2, 2002.

(51) Int. Cl.
*H04B 1/66* (2006.01)

(52) U.S. Cl. ............... 375/240.01; 375/240.2; 375/240.03; 375/240.25; 375/240.26; 375/240.18; 375/240.24; 382/233; 382/250; 382/251; 382/235; 382/248

(58) Field of Classification Search ........... 375/240.01, 375/240.2, 240.18, 240.03, 240.25, 240.24, 375/240.26; 382/250, 248, 251, 233, 235
See application file for complete search history.

(56) References Cited

U.S. PATENT DOCUMENTS

| | | | |
|---|---|---|---|
| 5,168,375 A * | 12/1992 | Reisch et al. | ............... 382/250 |
| 5,325,215 A | 6/1994 | Shibata et al. | |
| 5,357,594 A | 10/1994 | Fielder | |
| 5,379,351 A | 1/1995 | Fandrianto et al. | |
| 5,430,556 A | 7/1995 | Ito | |
| 5,590,066 A | 12/1996 | Ohki | |
| 5,864,637 A | 1/1999 | Liu et al. | |
| 5,970,173 A | 10/1999 | Lee et al. | |
| 5,995,539 A | 11/1999 | Miller | |
| 6,002,801 A | 12/1999 | Strongin et al. | |
| 6,029,126 A | 2/2000 | Malvar | |
| 6,057,855 A * | 5/2000 | Barkans | ............... 345/629 |

(Continued)

FOREIGN PATENT DOCUMENTS

CA 2452343 1/2003

(Continued)

OTHER PUBLICATIONS

Li et al., "On Implementing Transforms from Integers to Integers," *Department of Electrical Engineering, Princeton University*, pp. 881-885, Jun. 1998.

(Continued)

*Primary Examiner*—Shawn S. An
(74) *Attorney, Agent, or Firm*—Klarquist Sparkman, LLP

(57) ABSTRACT

A set of one and two-dimensional transforms is constructed subject to certain range limited constraints to provide a computationally efficient transform implementation, such as for use in image and video coding. The constraints can include that the transform has a scaled integer implementation, provides perfect or near perfect reconstruction, has a DCT-like basis, is limited to coefficient within a range for representation in n-bits (e.g., n is 16 bits), has basis functions that are close in norm, and provides sufficient headroom for overflow of the range. A set of transforms is constructed with this procedure having an implementation within a 16-bit integer range for efficient computation using integer matrix multiplication operations.

34 Claims, 6 Drawing Sheets

U.S. PATENT DOCUMENTS

| | | | |
|---|---|---|---|
| 6,058,215 A * | 5/2000 | Schwartz et al. | 382/244 |
| 6,073,153 A | 6/2000 | Malvar | |
| 6,115,689 A | 9/2000 | Malvar | |
| 6,154,762 A | 11/2000 | Malvar | |
| 6,301,304 B1 | 10/2001 | Jing et al. | |
| 6,324,560 B1 | 11/2001 | Malvar | |
| 6,363,117 B1 | 3/2002 | Kok | |
| 6,370,502 B1 | 4/2002 | Wu et al. | |
| 6,473,534 B1 | 10/2002 | Merhav et al. | |
| 6,487,574 B1 | 11/2002 | Malvar | |
| 6,496,795 B1 | 12/2002 | Malvar | |
| 6,507,614 B1 | 1/2003 | Li | |
| 6,600,785 B1 | 7/2003 | Nishigori et al. | |
| 6,687,726 B1 | 2/2004 | Schneider | |
| 6,694,342 B1 | 2/2004 | Mou | |
| 6,701,019 B1 | 3/2004 | Wu et al. | |
| 6,728,317 B1 | 4/2004 | Demos | |
| 6,831,951 B2 | 12/2004 | Yamada | |
| 6,882,685 B2 | 4/2005 | Malvar | |
| 7,123,655 B2 * | 10/2006 | Kerofsky | 375/240.03 |
| 2002/0154693 A1 | 10/2002 | Demos et al. | |

FOREIGN PATENT DOCUMENTS

| | | |
|---|---|---|
| CN | 1452396 | 10/2003 |
| DE | 41 33 460 A1 | 4/1993 |
| EP | 854653 | 7/1998 |
| JP | 63-219066 | 9/1988 |
| JP | 04-282988 | 10/1992 |
| JP | 06-045948 | 2/1994 |
| JP | 06-045949 | 2/1994 |
| JP | 06-054307 | 2/1994 |
| JP | 09-008665 | 1/1997 |
| JP | 10-091614 | 4/1998 |
| JP | 2003-348598 | 12/2003 |

OTHER PUBLICATIONS

Rubino et al., "Improved Chen-Smith Image Coder," *Electrical Engineering Department, Iniversity of Texas at Arlington*, pp. 267-270, 1993.

U.S. Appl. No. 60/341,674, filed Dec. 17, 2001, Lee et al.

U.S. Appl. No. 60/501,081, filed Sep. 7, 2003, Srinivasan et al.

U.S. Appl. No. 60/501,133, filed Sep. 7, 2003, Holcomb et al.

Liang et al., "Fast Multiplierless Approximation of the DCT with the Lifting Scheme," *Proc. SPIE Apps. of Digital Image Procesing XXIII*, 12 pp. (Aug. 2000).

Reader, "History of MPEG Video Compression—Ver. 4.0," 99 pp., document marked Dec. 16, 2003.

ISO/IEC, "ISO/IEC 11172-2, Information technology—Coding of moving pictures and associated audio for digital storage media at up to about 1,5 Mbit/s—Part 2: Video," 112 pp. (1993).

ISO/IEC, "JTC1/SC29/WG11 N2202, Information Technology—Coding of Audio-Visual Objects: Visual, ISO/IEC 14496-2," 329 pp. (1998).

ITU-T, "ITU-T Recommendation H.261, Video Codec for Audio-visual Services at p × 64 kbits," 25 pp. (1993).

ITU-T, "ITU-T Recommendation H.262, Information Technology—Generic Coding of Moving Pictures and Associated Audio Information: Video," 205 pp. (1995).

ITU-T, "ITU-T Recommendation H.263, Video coding for low bit rate communication," 162 pp. (1998).

Joint Video Team of ISO/IEC MPEG and ITU-T VCEG, "Final Joint Committee Draft of Joint Video Specification (ITU-T Recommendation H.264, ISO/IEC 14496-10 AVC," 206 pp. (Aug. 2002).

Printouts of FTP directories from http://ftp3.itu.ch , 8 pp. (downloaded from the World Wide Web on Sep. 20, 2005.).

Microsoft Corporation, "Microsoft Debuts New Windows Media Player 9 Series, Redefining Digital Media on the PC," 4 pp. (Sep. 4, 2002) [Downloaded from the World Wide Web on Jul. 16, 2004].

Mook, "Next-Gen Windows Media Player Leaks to the Web," BetaNews, 18 pp. (Jul. 19, 2002) [Downloaded from the World Wide Web on Mar. 16, 2004].

Bjontegaard, "H.26L Test Model Long Term No. 8 (TML-8) Draft 0," *Video Coding Experts Group (VCEG)*, pp. 1-46.

Calderbank et al., "Wavelet Transforms that Map Integers to Integers," pp. 1-39 (Aug. 1996).

Cham, "Development of Integer Cosine Transforms by the Principle of Dyadic Symmetry," *IEE Proceedings*, vol. 136, Pt. 1, No. 4, pp. 276-282 (Aug. 1989).

Liang et al., "A 16-bit Architecture for H.26L, Treating DCT Transforms and Quantization," *Thirteenth Meeting*: Austin, Texas, USA, pp. 1-17 (Apr. 2001).

J. W. Cooley and J. W. Tukey, "An algorithm for the machine calculation of complex Fourier series," *Math. Computation*, vol. 19, pp. 297-301, 1965.

W. Chen, C. H. Smith, and S. C. Fralick, "A fast computational algorithm for the discrete cosine transform," *IEEE Trans. Commun.*, vol. 25, pp. 1004-1009, Sep. 1977.

H. Malvar, "Fast computation of the discrete cosine transform and the discrete Hartley transform," *IEEE Trans. Acoust., Speech, Signal Processing*, vol. ASSP-35, pp. 1484-1485, Oct. 1987.

C. Loeffler et al., "Practical fast 1-D DCT algorithms with 11 multiplications," *Proc. IEEE ICASSP*, vol. 2, pp. 988-991, Feb. 1989.

Arai, et al., "A Fast DCT-SQ Scheme for Images," The Transactions of the IEICE, vol. E 71, No. 11, Nov. 1988, pp. 1095-1097.

Shao, "Implementing JPEG with TMS320C2xx Assembly Language Software", *Texas Instruments Application Report SPRA615*, pp. 1-48 (Jan. 2000) http://focus.ti.com/lit/an/spra615/spra615.pdf [Downloaded from the World Wide web on Dec. 28, 2005].

Hohl, "An 8×8 Discrete Cosine Transform Implementation on the TMS320C25 or the TMS320C30", *Texas Instruments Application Report SPRA115*, pp. 1-25 (1990) http://focus.ti.com/lit/an/spra115/spra115.pdf [Downloaded from the World Wide web on Dec. 28, 2005].

U.S. Appl. No. 60/488,710, filed Jul. 18, 2003, Srinivasan et al.

Ishii et al., "Parallel Variable Length Decoding with Inverse Quantization for Software MPEG-2 Decoders," *IEEE Signal Processing Systems*, pp. 500-509 (1997).

Jeong et al., "A Fast Algorithm Suitable for DCT Implementation with Integer Multiplication," *IEEE TENCON*, vol. 2, pp. 784-787 (1996).

Liang et al., "Approximating the DCT with the Lifting Scheme: Systematic Design and Applications," *IEEE Conference Record of the 34th Asilomar Conference*, vol. 1, pp. 192-196 (Oct. 2000).

Malvar, "Low-complexity Length-4 Transform and Quantization with 16-bit Arithmetic," *Proposal, ITU Study Group 16 Questions 6 Video Coding Experts Group*, 24 pp., 14th Meeting held Sep. 24-27, 2001, Santa Barbara, CA.

Pei et al., "The Integer Transforms Analogous to Discrete Trigonometric Transforms," *IEEE Transactions on Signal Processing*, vol. 48, No. 12, pp. 3345-3364 (Dec. 2000).

Sriram et al., "MPEG-2 Video decoding on the TMS320C6X DSP Architecture," *IEEE Conference Record on the 32nd Asilomar Conference*, vol. 2, pp. 1735-1739 (1998).

Sullivan et al., "The H.264/AVC Advanced Video Coding Standard: Overview and Introduction to the Fidelity Range Extensions," 21 pp. (Aug. 2004).

Tran, "The BinDCT: Fast Multiplierless Approximation of the DCT," *IEEE Signal Processing Letters*, vol. 7, No. 6, pp. 141-144 (Jun. 2000).

Wien, "Variable Block-Size Transforms for Hybrid Video Coding," Dissertation, 182 pp. (Feb. 2004).

* cited by examiner

2-D TRANSFORMS FOR IMAGE AND VIDEO CODING

RELATED APPLICATION INFORMATION

This application claims the benefit of U.S. Provisional Patent Application Ser. No. 60/377,298, filed May 2, 2002, which is incorporated herein by reference.

TECHNICAL FIELD

The present invention relates to techniques for digitally encoding and processing signals. The invention more particularly relates to construction of and use of a class of computationally efficient transforms in encoding and decoding of signals, such as images and video.

BACKGROUND

Transform coding is a compression technique used in many audio, image and video compression systems. Uncompressed digital image and video is typically represented or captured as samples of picture elements or colors at locations in an image or video frame arranged in a two dimensional grid. For example, a typical format for images consists of a stream of 24-bit color picture element samples arranged as a grid. Each sample is a number representing color components at a pixel location in the grid within a color space, such as RGB, or YIQ, among others. Various image and video systems may use various different color, spatial and time resolutions of sampling.

Uncompressed digital image and video signals can consume considerable storage and transmission capacity. Transform coding reduces the size of digital images and video by transforming the spatial-domain representation of the signal into a frequency-domain (or other like transform domain) representation, and then reducing resolution of certain generally less perceptible frequency components of the transform-domain representation. This generally produces much less perceptible degradation of the digital signal compared to reducing color or spatial resolution of images or video in the spatial domain.

More specifically, a typical transform coding technique divides the uncompressed digital image's pixels into fixed-size two dimensional blocks, each block possibly overlapping with other blocks. A linear transform that does spatial-frequency analysis is applied to each block, which converts the spaced samples within the block to a set of frequency (or transform) coefficients generally representing the strength of the digital signal in corresponding frequency bands over the block interval. For compression, the transform coefficients may be selectively quantized (i.e., reduced in resolution, such as by dropping least significant bits of the coefficient values or otherwise mapping values in a higher resolution number set to a lower resolution), and also entropy or variable-length coded into a compressed data stream. At decoding, the transform coefficients will inversely transform to nearly reconstruct the original color/spatial sampled image/video signal.

Many image and video compression systems, such as MPEG and Windows Media, among others, utilize transforms based on the Discrete Cosine Transform (DCT). The DCT is known to have favorable energy compaction properties that result in near-optimal data compression. In these compression systems, the inverse DCT (IDCT) is employed in the reconstruction loops in both the encoder and the decoder of the compression system for reconstructing individual image blocks. An exemplary implementation of the IDCT is described in "IEEE Standard Specification for the Implementations of 8×8 Inverse Discrete Cosine Transform," IEEE Std. 1180-1990, Dec. 6, 1990.

A drawback to the IDCT transform as defined in the IEEE Std. 1180-1990 is that calculation of the transform involves matrix multiplication of 64-bit floating point numbers, which is computationally expensive. This can limit performance of the image or video compression system, particularly in streaming media and like media playback applications, where the IDCT is performed on large amounts of compressed data on a real-time basis or under other like time constraints.

SUMMARY

A class of one and two-dimensional transforms, techniques for constructing such transforms and media coding/decoding systems utilizing such transforms are described herein.

The described transforms have implementations based on matrix multiplication operations on integer numbers for computational efficiency. In typical general purpose and graphics processors, matrix multiplication operations on integers can be executed much more quickly than on floating point numbers. Further, some 32-bit processors provide multiplication operations on two 16-bit integers at a time. In an exemplary implementation, the described transforms are performed with 16-bit integer matrix multiplications. The implementation of the described transforms with integer matrix multiplication speeds coding and decoding performance in a media coding/decoding system.

The described transforms can be generated via a construction procedure described herein. The construction procedure generates transforms of the transform class based on selecting a set of transform coefficients subject to certain constraints. The constraints can include that the transform has a scaled integer implementation, provides perfect or near perfect reconstruction, has a DCT-like basis, is limited to coefficient within a range for representation in n-bits (e.g., n is 16 bits), has basis functions that are close in norm, and provides sufficient headroom for overflow of the range.

Using the described construction procedure, a set of transforms with 4 and 8 point components in one dimension, gives rise to 8×8, 8×4, 4×8 and 4×4 block transforms in two dimensions. Compression systems based on the transforms, which permit implementations using 16-bit matrix multiplications, can provide more computationally efficient encoding and decoding.

Additional features and advantages of the invention will be made apparent from the following detailed description of embodiments that proceeds with reference to the accompanying drawings.

DETAILED DESCRIPTION

The following description is directed to a class of one and two-dimensional transforms for computational efficiency, techniques for constructing such transforms subject to certain criteria, and use of such transforms in signal processing, and particularly media compression systems based on such transforms. An exemplary application of the transforms is in an image or video encoder and decoder, such as an encoder and decoder employing a variation of the Microsoft Windows Media Video (WMV) File format. However, the transforms constructed as described herein are not limited to this format, and can be applied to other media coding formats. Accordingly, the transforms are described in the context of a generalized image or video encoder and decoder, but alternatively can be incorporated in various types of media signal encoders and decoders.

I. Generalized Video Encoder and Decoder

Figure 1:
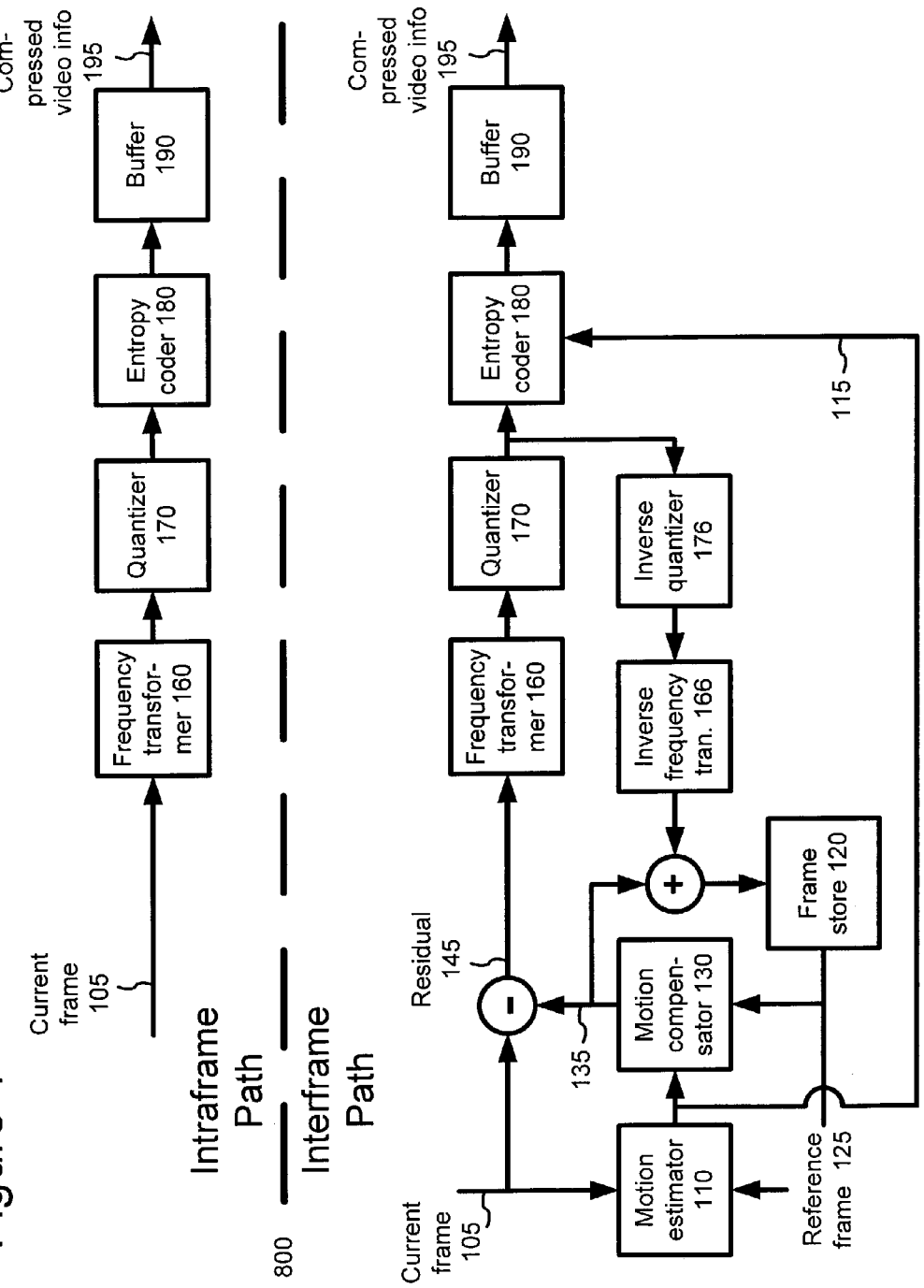
FIG. 1 is a block diagram of a video encoder based on a class of transforms described herein.
Figure 2:
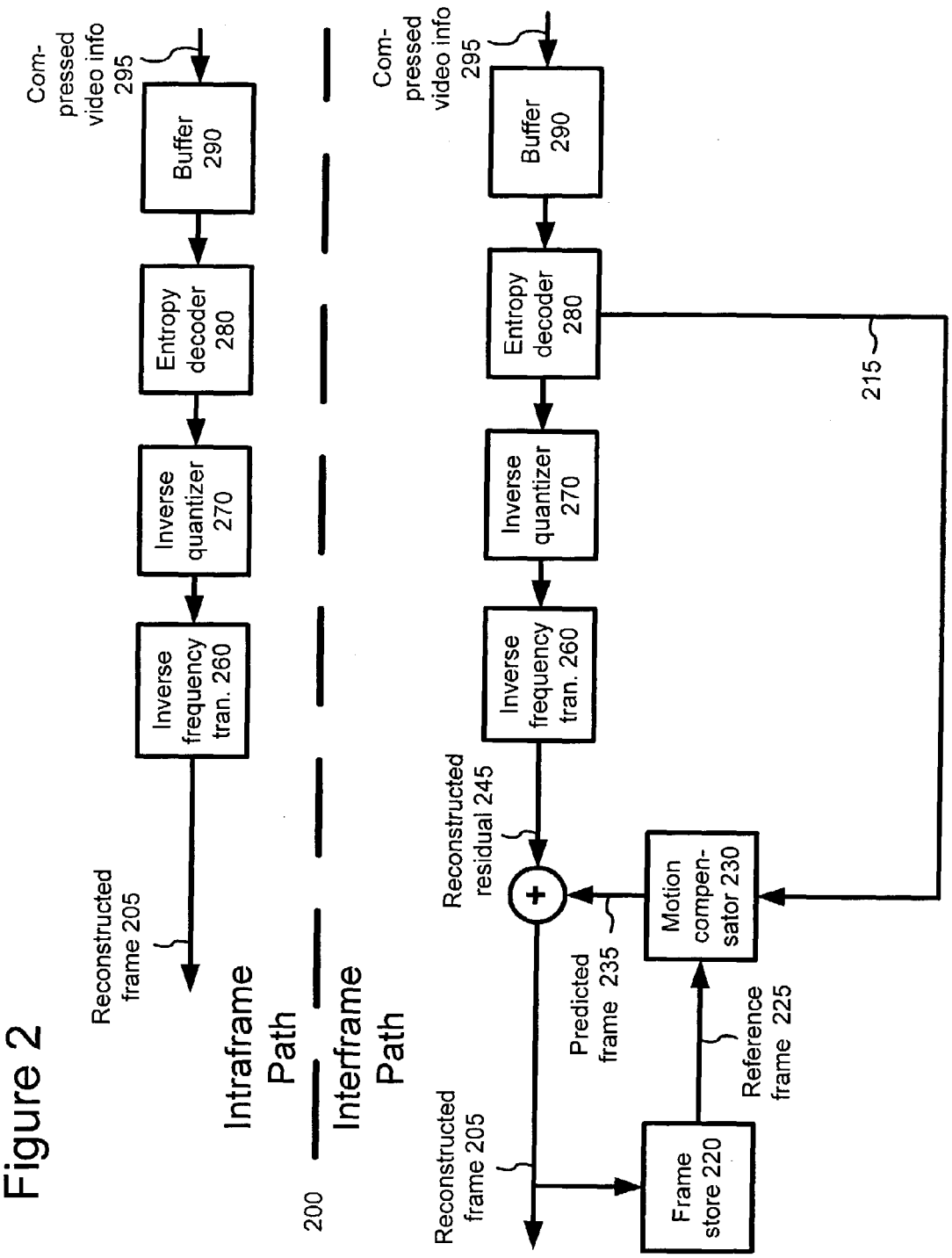
FIG. 2 is a block diagram of a video decoder based on the described class of transforms.

FIG. 1 is a block diagram of a generalized video encoder (100) and FIG. 2 is a block diagram of a generalized video decoder (200).

The relationships shown between modules within the encoder and decoder indicate the main flow of information in the encoder and decoder; other relationships are not shown for the sake of simplicity. In particular, FIGS. 1 and 2 usually do not show side information indicating the encoder settings, modes, tables, etc. used for a video sequence, frame, macroblock, block, etc. Such side information is sent in the output bitstream, typically after entropy encoding of the side information. The format of the output bitstream can be a Windows Media Video format or another format.

The encoder (100) and decoder (200) are block-based and use a 4:2:0 macroblock format with each macroblock including 4 luminance 8×8 luminance blocks (at times treated as one 16×16 macroblock) and two 8×8 chrominance blocks. Alternatively, the encoder (100) and decoder (200) are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 1 is a block diagram of a general video encoder system (100). The encoder system (100) receives a sequence of video frames including a current frame (105), and produces compressed video information (195) as output. Particular embodiments of video encoders typically use a variation or supplemented version of the generalized encoder (100).

The encoder system (100) compresses predicted frames and key frames. For the sake of presentation, FIG. 1 shows a path for key frames through the encoder system (100) and a path for forward-predicted frames. Many of the components of the encoder system (100) are used for compressing both key frames and predicted frames. The exact operations performed by those components can vary depending on the type of information being compressed.

A predicted frame [also called p-frame, b-frame for bidirectional prediction, or inter-coded frame] is represented in terms of prediction (or difference) from one or more other frames. A prediction residual is the difference between what was predicted and the original frame. In contrast, a key frame [also called i-frame, intra-coded frame] is compressed without reference to other frames.

If the current frame (105) is a forward-predicted frame, a motion estimator (110) estimates motion of macroblocks or other sets of pixels of the current frame (105) with respect to a reference frame, which is the reconstructed previous frame (125) buffered in the frame store (120). In alternative embodiments, the reference frame is a later frame or the current frame is bi-directionally predicted. The motion estimator (110) outputs as side information motion information (115) such as motion vectors. A motion compensator (130) applies the motion information (115) to the reconstructed previous frame (125) to form a motion-compensated current frame (135). The prediction is rarely perfect, however, and the difference between the motion-compensated current frame (135) and the original current frame (105) is the prediction residual (145). Alternatively, a motion estimator and motion compensator apply another type of motion estimation/compensation.

A frequency transformer (160) converts the spatial domain video information into frequency domain (i.e., spectral) data. For block-based video frames, the frequency transformer (160) applies a transform described in the following sections that has properties similar to the discrete cosine transform ["DCT"]. In some embodiments, the frequency transformer (160) applies a frequency transform to blocks of spatial prediction residuals for key frames. The frequency transformer (160) can apply an 8×8, 8×4, 4×8, or other size frequency transforms.

A quantizer (170) then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (100) can use frame dropping, adaptive filtering, or other techniques for rate control.

When a reconstructed current frame is needed for subsequent motion estimation/compensation, an inverse quantizer (176) performs inverse quantization on the quantized spectral data coefficients. An inverse frequency transformer (166) then performs the inverse of the operations of the frequency transformer (160), producing a reconstructed prediction residual (for a predicted frame) or a reconstructed key frame. If the current frame (105) was a key frame, the reconstructed key frame is taken as the reconstructed current frame (not shown). If the current frame (105) was a predicted frame, the reconstructed prediction residual is added to the motion-compensated current frame (135) to form the reconstructed current frame. The frame store (120) buffers the reconstructed current frame for use in predicting the next frame. In some embodiments, the encoder applies a deblocking filter to the reconstructed frame to adaptively smooth discontinuities in the blocks of the frame.

The entropy coder (180) compresses the output of the quantizer (170) as well as certain side information (e.g., motion information (115), quantization step size). Typical entropy coding techniques include arithmetic coding, differential coding, Huffman coding, run length coding, LZ coding, dictionary coding, and combinations of the above. The entropy coder (180) typically uses different coding techniques for different kinds of information (e.g., DC coefficients, AC coefficients, different kinds of side information), and can choose from among multiple code tables within a particular coding technique.

The entropy coder (180) puts compressed video information (195) in the buffer (190). A buffer level indicator is fed back to bitrate adaptive modules. The compressed video information (195) is depleted from the buffer (190) at a constant or relatively constant bitrate and stored for subsequent streaming at that bitrate. Alternatively, the encoder system (100) streams compressed video information immediately following compression.

Before or after the buffer (190), the compressed video information (195) can be channel coded for transmission over the network. The channel coding can apply error detection and correction data to the compressed video information (195).

B. Video Decoder

FIG. 2 is a block diagram of a general video decoder system (200). The decoder system (200) receives information (295) for a compressed sequence of video frames and produces output including a reconstructed frame (205). Particular embodiments of video decoders typically use a variation or supplemented version of the generalized decoder (200).

The decoder system (200) decompresses predicted frames and key frames. For the sake of presentation, FIG. 2 shows a path for key frames through the decoder system (200) and a path for forward-predicted frames. Many of the components of the decoder system (200) are used for compressing both key frames and predicted frames. The exact operations performed by those components can vary depending on the type of information being compressed.

A buffer (290) receives the information (295) for the compressed video sequence and makes the received information available to the entropy decoder (280). The buffer (290) typically receives the information at a rate that is fairly constant over time, and includes a jitter buffer to smooth short-term variations in bandwidth or transmission. The buffer (290) can include a playback buffer and other buffers as well. Alternatively, the buffer (290) receives information at a varying rate. Before or after the buffer (290), the compressed video information can be channel decoded and processed for error detection and correction.

The entropy decoder (280) entropy decodes entropy-coded quantized data as well as entropy-coded side information (e.g., motion information, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (280) frequently uses different decoding techniques for different kinds of information (e.g., DC coefficients, AC coefficients, different kinds of side information), and can choose from among multiple code tables within a particular decoding technique.

If the frame (205) to be reconstructed is a forward-predicted frame, a motion compensator (230) applies motion information (215) to a reference frame (225) to form a prediction (235) of the frame (205) being reconstructed. For example, the motion compensator (230) uses a macroblock motion vector to find a macroblock in the reference frame (225). A frame buffer (220) stores previous reconstructed frames for use as reference frames. Alternatively, a motion compensator applies another type of motion compensation. The prediction by the motion compensator is rarely perfect, so the decoder (200) also reconstructs prediction residuals.

When the decoder needs a reconstructed frame for subsequent motion compensation, the frame store (220) buffers the reconstructed frame for use in predicting the next frame. In some embodiments, the encoder applies a deblocking filter to the reconstructed frame to adaptively smooth discontinuities in the blocks of the frame.

An inverse quantizer (270) inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer (260) converts the quantized, frequency domain data into spatial domain video information. For block-based video frames, the inverse frequency transformer (260) applies an inverse transform described in the following sections. In some embodiments, the inverse frequency transformer (260) applies an inverse frequency transform to blocks of spatial prediction residuals for key frames. The inverse frequency transformer (260) can apply an 8×8, 8×4, 4×8, or other size inverse frequency transforms.

II. Transform Overview

Figure 3:
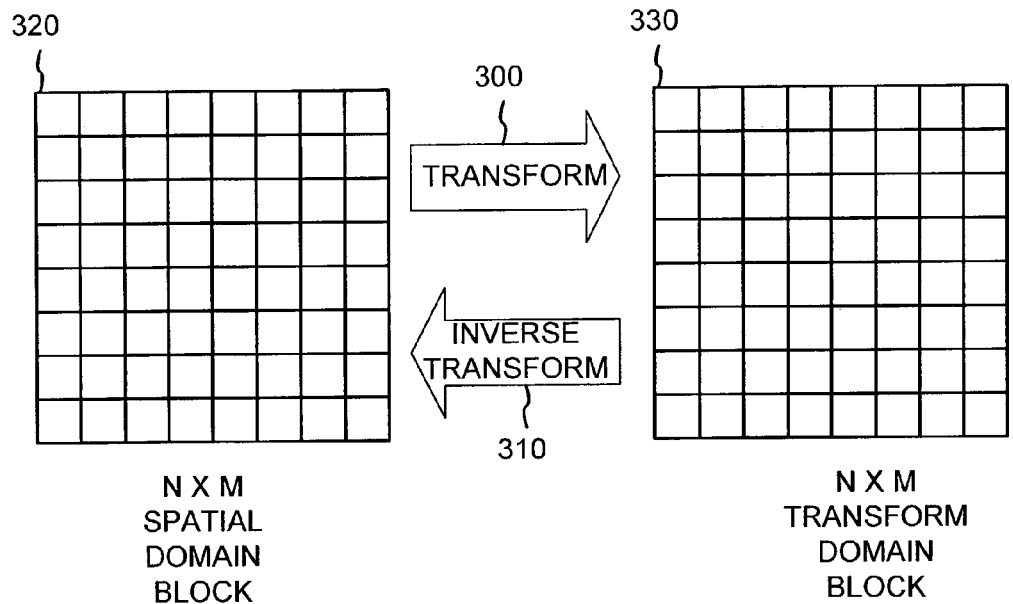
FIG. 3 is a block diagram illustrating a two-dimensional transform.

FIG. 3 illustrates a two-dimensional transform 300 and inverse transform 310 used in the video encoder 100 and decoder 200 of FIGS. 1 and 2. The transform 300 and inverse transform 310 are from a class of transforms constructed subject to certain constraints, as described below.

The two-dimensional transform 300 converts a two-dimensional (n×m) block 320 of media content represented as spatially-related samples of the media content into a transform domain block. For example, the block can be a portion of a digital image or digital video frame, such as may be represented as an array of color samples (pixels) arranged in uniformly-spaced grid locations. This is referred to as the spatial domain representation of the media content. The transform block also is composed of n×m samples, in what is referred to herein as a transform domain representation of the media content.

The inverse transform 320 converts a block of samples from the transform domain back into the original or spatial domain.

III. Transform-based Coding

In general, transform-based coding 400 of media content, such as in the video encoder and decoder described above, utilizes the transform 300 (FIG. 3) and inverse transform 310 (FIG. 3) together with quantization to encode the media content in a compressed form. The transform-based coding first applies the transform 300 in a transform stage 410 to an input block of the media content for conversion to the transform domain. The transform-based coding then performs quantization (i.e., reduces the resolution) of certain transform-domain samples (e.g., which produce less perceptible degradation of the media content) in a quantization stage 420. The quantized transform-domain samples can be used to produce the compressed form of the media content.

The transform-based coding 400 also has an inverse quantization stage 430 and inverse transform stage 440. In the inverse quantization stage 430, the transform-based coding maps the quantized, transform domain samples back to their original resolution in preparation for the inverse transform 310. The transform-based coding performs the inverse transform on the dequantized transform domain samples in the inverse transform stage to then reconstruct the media content block.

The transform-based coding 400 can be performed at various points in the video encoder and decoder. For example, the video encoder also can include a reconstruction loop with the inverse quantization and inverse transform stages, for use in differential encoding and interframe coding techniques.

III. Computationally Efficient Inverse Transform Implementation

Figure 5:
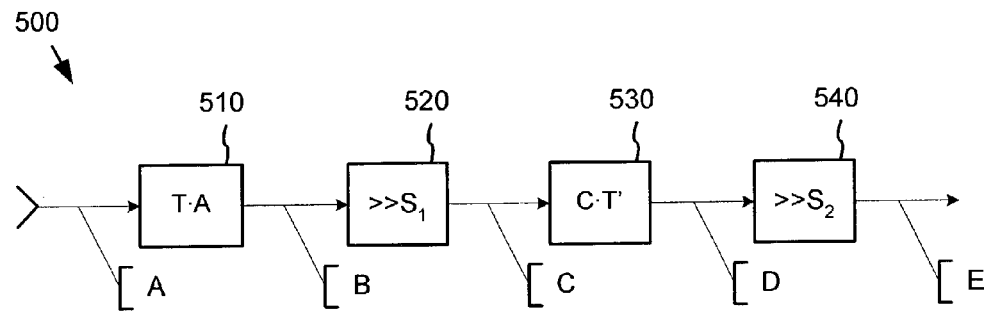
FIG. 5 is a block diagram of an implementation of the inverse transform for the described class of transforms.

With reference now to FIG. 5, the transform 300 and inverse transform 310 (FIG. 3) preferably are implemented as a pre-multiplication 510 of the two-dimensional data block (of spatial domain samples for the transform 300, and of transform domain samples for the inverse transform) by a pre-multiplication transform matrix (T), and a post-multiplication 530 by post-multiplication transform matrix (T'). The rows of the pre-multiplication transform matrix (T) represent basis functions of the transform, which are applied to columns of the data block in the pre-multiplication 510. Similarly, the columns of the post-multiplication matrix (T') are the transform basis functions that are applied to the rows of the data block in the post-multiplication 530.

For computational efficiency, the transform matrices (T and T') and the data block are composed of integer numbers within ranges permitting the matrix multiplications to be performed using integer multiplication operations of the computer or graphics processor. For example, with many current processors that provide 16-bit integer multiplication operations, the matrices preferably are composed of integers within a range that permits the matrix multiplications to be performed using the 16-bit integer multiplication operations. Alternatively, the matrices can be composed of integer numbers in smaller or larger ranges for processors that provide integer multiplication operations of other size integers, The pre-multiplication and post-multiplication of the data block by transform basis functions composed of integer numbers produces resulting data block values in a larger range. The implementation 500 compensates this enlargement by the basis function multiplication using scaling operations 520, 540 after the pre-multiplication and post-multiplication, respectively. For computational efficiency, the scaling operations 520, 540 preferably are shift operations (effectively dividing by a power of two), which shift the values a number of bit positions, $S_1$ and $S_2$, respectively.

In the illustrated implementation 500, the values in the data block are integer numbers having bit sizes at the input of the pre-multiplication 510, scaling 520, post-multiplication 530, scaling 540 and output represented as A-E, respectively. For example, the values of the data block at the input of the pre-multiplication stage 510 are integers that are A-bits in size.

An underlying principle in the design of this transform is its implementation 500 as a forward and inverse transform pair, the latter being implemented in limited precision integer arithmetic, where the inverse transform is guaranteed to generate a meaningful result for input data that has been generated by the corresponding forward transform process (subject to valid quantization and dequantization).

IV. Transform Construction

The computationally efficient transforms are constructed by choosing coefficient values for the transform basis functions (i.e., the values in the pre-multiplication matrix T and post-multiplication matrix T') subject to certain constraints, which are described below. This construction technique can produce range restricted, orthogonal or bi-orthogonal transforms.

Constraints.

Scaled Integer Implementation. The transform coefficients are integers with a possible scaling by a power of 2. This facilitates implementation on a standard computer.

Figure 4:
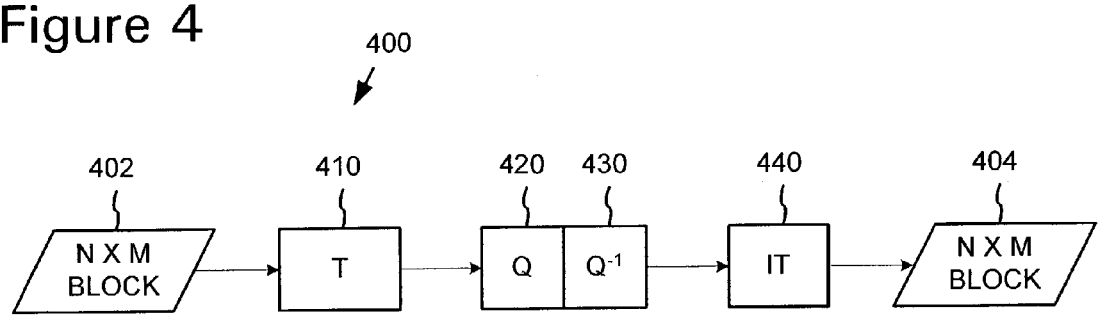
FIG. 4 is a data flow diagram illustrating transform coding using the described class of transforms with the video encoder and decoder of FIGS. 1 and 2.

Perfect Reconstruction. In the absence of quantization (e.g., the quantization and inverse quantization stages 420, 430 in FIG. 4), the inverse transform perfectly reconstructs the original spatial domain data from the transform domain data produced by the transform. The primary requirement for a transform used to compress data is that the forward and inverse transform form a perfect reconstruction pair, under no quantization and rounding. This can be guaranteed through orthonormality or biorthonormality. In the former case, the forward and inverse transforms are identical, while in the latter they are different.

DCT Like Basis. The transform and inverse transform have properties similar to the DCT. For good coding performance, it is preferable for the transform to closely approximate a DCT. The DCT is known to have favorable energy compaction properties that results in near-optimal data compression. The DC basis function of the DCT is a constant value. This constrains the transform coefficients of the "zeroth" basis to have constant values.

Range. The range of the data values and transform coefficients permits implementation using computationally efficient integer multiplication operations on the target computer or graphics processor (e.g., in 16-bit integer operations). In a preferred implementation, the values are constrained to a range allowing for a 16 bit implementation of the inverse transform. In this implementation, a 16-bit integer operation is an arithmetic operation on integers that can be performed with a 16-bi accumulator, and signed modulo or rollover arithmetic to the base $2^{16}$, I.e., an accumulator with a data range from [−32768 . . . 32767]. Multiplication of two 16-bit numbers results in only the lower 16 bits of the product being preserved. Alternatively, the range can vary for other target platforms that support another bit size of integer operations.

The multiplication of the samples in the data block by the transform basis functions effects an expansion in range, which varies by the number of samples (points) in the transform basis function. In video compression systems, two-dimensional (N×M points) transforms of 8×8, 4×8, 8×4 and 4×4 points commonly are used. Between the 4 and 8 point transforms, the 8 point transform places the tighter constraints on range of integer transform coefficients. This is because the expansion associated with the N point transform is larger than that with the M-point transform, when N>M. The DC value expands as $\sqrt{N}$ for an N-point transform. Accordingly, we first consider the 8 point transform since it presents the tighter constraint.

For example, a common range for the spatial domain data block samples in video compression systems is [−255 . . . 255], which is 9-bits of resolution. For such 9 bit input corresponding to a range of [−255 255], the 8×8 transform can take on values in the range [−2047 2047], requiring 12 bits of precision. In effect, each 8 point transform results in an expansion of 1.5 bits. For a two-dimensional 8×8 transform, an 8 point transform is applied twice, with row transforms at pre-multiplication stage 510 (FIG. 5) and column transforms at post-multiplication stage 530 (FIG. 5), so that the resulting transform domain samples are expanded by 3 bits (to 12 bit resolution).

With reference more particularly to FIG. 5, the input transform-domain data block at input A for the inverse transform in an exemplary implementation has a range of 12-bits, whereas the reconstructed spatial domain data block at output E has a range of 9-bits. Two inverse transform operations (pre-multiplication 510 and post-multiplication 530) cause a scaling or range expansion of $|T|^2$, which is compensated by two shifts of $s_1$ and $S_2$ bits, respectively. This requires that the range expansion caused by the transforms is approximately equal to the compensatory scaling, or $|T|^2 \approx 2(s_1+s_2)$. Assuming the transform matrix (T) is a normalized matrix (where $T_1=T/|T|$), the dynamic range of the resulting data block (B=T·A) after pre-multiplication is about 10.5-bits. The resulting data block (B) therefore has a range of $10.5+\log_2(|T|)$ bits. Likewise, the post-multiplication data block (D=C·T') has a range of $9+2\cdot\log_2(|T|)-s_1$ bits. For a computationally efficient implementation of the inverse transform using 16-bit integer operations, the following relations are required (denoting $\log_2(|T|)$ by L):

$$10.5+L<=16 \quad (1)$$

$$9+2L-s_1<=16 \quad (2)$$

$$2L \approx s_1+s_2 \quad (3)$$

It therefore follows that (9+m<=16), i.e. m=6; and L<=5.5 or |T|<=2048.

Further, letting the DC basis function of the inverse transform to be given by [d d d d d d d d], the range constraint requires that $8 d^2 <= 2048$, or d<=16.

Norms Of Basis Functions. The basis functions for the transform are very close in norm.

In general orthogonal and biorthogonal integer transforms, different rows of the transform matrix T corresponding to different basis functions are allowed to have different norms. The idea behind this flexibility is that the effect of mismatch between norms can be annulled for the forward and inverse transforms during quantization and inverse quantization. In practice, normalization presents two difficulties—(1) it adds complexity especially to the decoder side and (2) unless the normalizing multipliers are small integers, it makes it impossible for a short integer (16 bit) implementation.

If it is required that the norms of all basis functions be identical, then additional renormalization is unnecessary. Any normalization term can be factored into inverse quantization. The effect of quantization values may shift a little in this process (i.e. the rate-distortion point of a certain quantization point (QP) may move away, but along the rate-distortion (R-D) curve from its original value computed, say, using a normalized full precision transform).

When it comes to 4 and 8 point transforms, the same logic applies. It can be required that the norms of all basis functions, whether 4 or 8 point, be the same so that normalization can pulled out. In practice, it is impossible to find a set of transform coefficients subject to a constraint that all the norms of all basis functions are identical, for reasonably small integer bases. The constraint here allows for a small degree of flexibility by permitting only basis functions that are very close in norm.

Headroom. Although the range of valid input (the spatial-domain data block) to the forward transform is 9 bits in one implementation, there is a chance that the reconstructed data block after quantization (stage 420 in FIG. 4) may overflow above or below the range +255 through −255. The short integer implementation is required to take this into account by leaving sufficient headroom for such situations.

In summary, the construction technique described herein produces transforms that are subject to the constraints: (1) scaled integer implementation, (2) orthonormality or perfect reconstruction, (3) DCT-like basis for energy compaction, and (4) limited range for an integer-based implementation (e.g., in 16-bit integer operations). For a given range limitation, it is difficult to satisfy all the above constraints. As a particular example, it is not possible to construct a transform that satisfies the first three of these constraints, as well as being range limited to 16-bits. The below-described construction process produces efficient, range-restricted transforms, by slightly relaxing one or more of the constraints (e.g., relaxing the orthonormality constraint in the illustrated transform implementation). In the illustrated transform implementation, the transform pair is required only to be orthogonal, while the norms can be slightly different. This added flexibility expands the search space for transforms, which makes feasible constructing efficient range-restricted transforms that satisfy the other constraints. As further discussed below, the effect of the slight mismatch in norms can be annulled by renormalization during the quantization stage. With the renormalization implemented in the quantization stage, the resultant increase in complexity is incurred only at the encoder. This significantly reduces the complexity of the overall system, while maintaining compression efficiency.

Construction.

Figure 6:
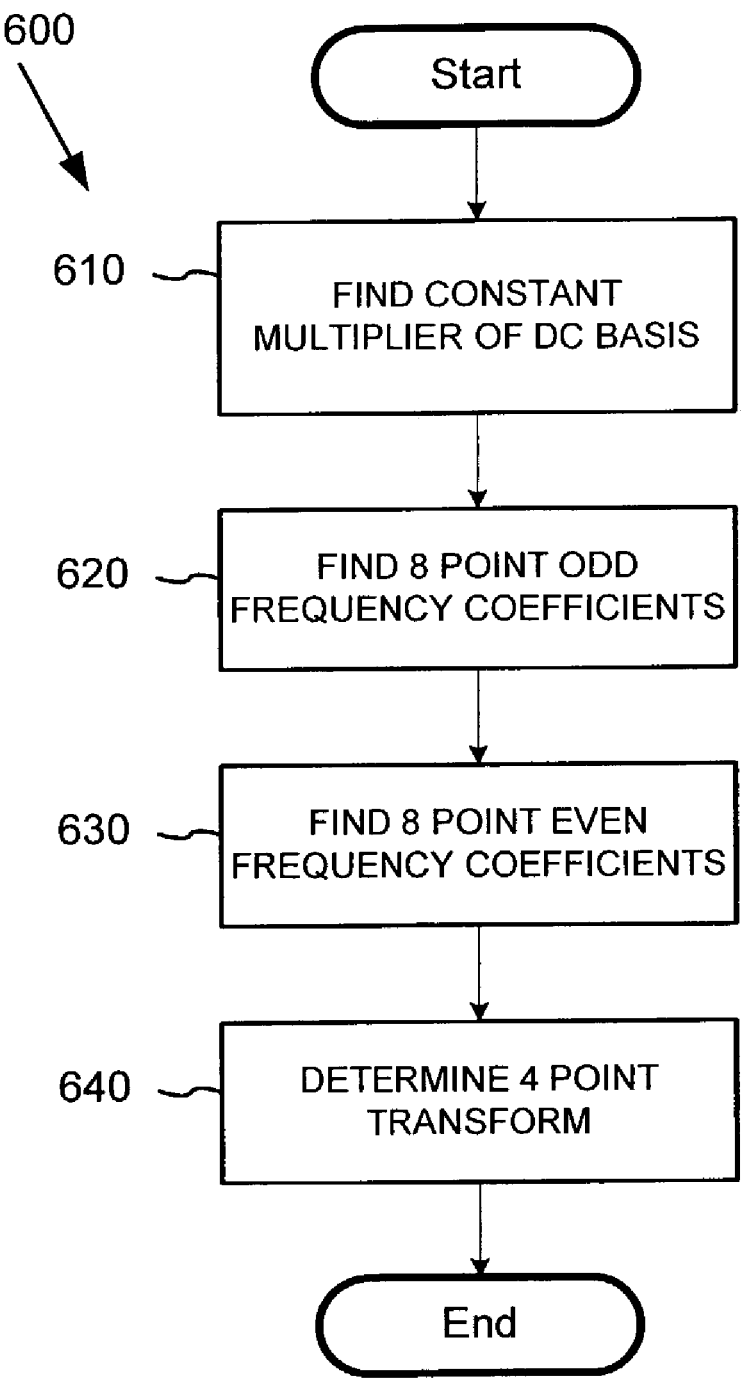
FIG. 6 is a flow chart of a process for constructing one of the described class of transforms.
Figure 7:
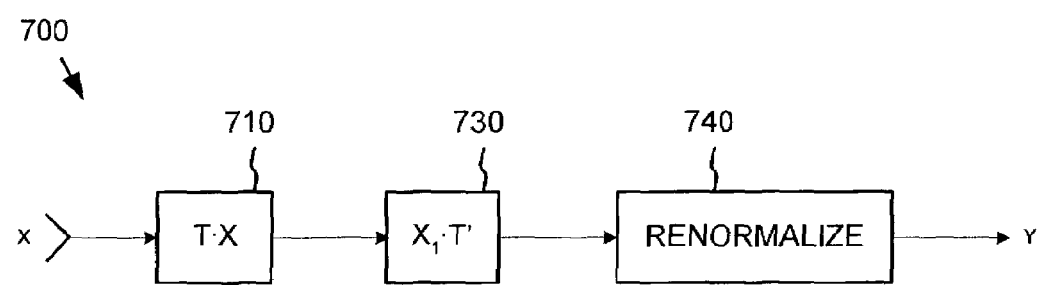
FIG. 7 is a block diagram of an implementation of the forward transform for the described class of transforms.

With reference now to FIG. 6, a process 600 to construct a computationally efficient transform subject to these constraints produces a set of orthogonal transform coefficients for the pre-multiplication and post-multiplication transform matrices (T and T') for the transform implementation 500 in FIG. 5. Some of the tolerance thresholds used in this construction procedure to produce this exemplary computationally efficient transform implementation are arbitrary, and can be further relaxed to arrive at further solutions. Although due to the loosened thresholds, such alternative transform implementations may have worse coding performance.

An exemplary set of computationally efficient transforms constructed using this procedure 600 include two-dimensional transforms using 4 and 8-point basis functions. Based on the 4 and 8-point basis functions, transforms matrices for 8×8, 4×8, 8×4, and 4×4 transforms are produced. However, the construction process alternatively can be varied to produce transforms with basis functions having other number of points, or block dimensions.

A first step 610 in the construction process 600 is to find the constant multiplier of the DC basis function. For 4 and 8-point basis functions, the constant multipliers are denoted $d_4$ and $d_8$, respectively. As per the norm constraint discussed above, these constant multipliers are related as: $d_4 \approx \sqrt{2} d_8$, such that $d_8 \leq 16$. The only integer pairs $\{d_4, d_8\}$ that satisfy this norm constraint within about 1% are $\{7,5\}$, $\{10,7\}$, $\{17,12\}$ and $\{20,14\}$. For the 8 point transform, the squared norm of the DC basis is $8d_8^2$. The permissible 8-point square norms for the DC basis with these integer pairs are therefore 200, 392, 1152 and 1568.

A second step 620 in the construction process 600 is to determine the odd basis functions (also referred to as the odd "frequencies") of the transform. According to the "DCT-like basis" constraint discussed above, the transforms should have properties similar to the DCT transform, which for the 8-point DCT transform has the following odd basis functions:

$$\begin{bmatrix} 0.4904 & 0.4157 & 0.2778 & 0.0975 & -0.0975 & -0.2778 & -0.4157 & -0.4904 \\ 0.4157 & -0.0975 & -0.4904 & -0.2778 & 0.2778 & 0.4904 & 0.0975 & -0.4157 \\ 0.2778 & -0.4904 & 0.0975 & 0.4157 & -0.4157 & -0.0975 & 0.4904 & -0.2778 \\ 0.0975 & -0.2778 & 0.4157 & -0.4904 & 0.4904 & -0.4157 & 0.2778 & -0.0975 \end{bmatrix}$$

Four constant values determine these odd basis functions of the 8-point DCT. Due to the structure of bases, the constants C1, C2, C3 and C4 can be used to replace the unique absolute coefficients, giving the basis:

$$\begin{bmatrix} C1 & C2 & C3 & C4 & -C4 & -C3 & -C2 & -C1 \\ C2 & -C4 & -C1 & -C3 & C3 & C1 & C4 & -C2 \\ C3 & -C1 & C4 & C2 & -C2 & -C4 & C1 & -C3 \\ C4 & -C3 & C2 & -C1 & C1 & -C2 & C3 & -C4 \end{bmatrix}$$

Construction proceeds by searching over the space $\{C_1, C_2, C_3, C_4\}$ with the following conditions:
1. Orthogonality of the basis. Orthogonality of odd terms with even frequency terms is implicit given the complementary structure of even frequencies. Therefore, this condition reduces to orthogonality of the odd basis functions.
2. DCT-like basis. The vector $[C_1\ C_2\ C_3\ C_4]$ correlates "well" with the corresponding DCT coefficient vector [0.4904 0.4157 0.2778 0.0975]. Correlation is measured by the cosine of the angle between the vectors, and is desired to be as close to 1 as possible. Other measures for correlation may also be used.
3. The norms of the odd bases match the DC norm closely. This can be expressed as:

$C_1^2+C_2^2+C_3^2+C_4^2 \approx$ one of $\{100,196,576,784\}$

Within a tolerance of 5% of the norm (condition 3), and permissible correlation "cosine" of 0.99 (condition 2), there is only one set of integer coefficients that satisfies the constraints for the 8-point odd basis functions. This set is [16 15 9 4], and has a norm of 578, which is definitely very close to the desired 576. The correlation is a healthy 0.9984.

A third step 630 of the construction process 600 is to determine the even basis functions or even frequencies for the transform. Again, per the DCT-like basis constraint, the even basis functions should correlate well to those of the DCT transform. For the 8-point DCT transform, the even basis functions are as follows:

$$\begin{bmatrix} 12 & 12 & 12 & 12 & 12 & 12 & 12 & 12 \\ C5 & C6 & -C6 & -C5 & -C5 & -C6 & C6 & C5 \\ 12 & -12 & -12 & 12 & 12 & -12 & -12 & 12 \\ C6 & -C5 & C5 & -C6 & -C6 & C5 & -C5 & C6 \end{bmatrix}$$

The norm constraint on frequencies 2 and 6 is given by $C_5^2+C_6^2 \approx 288$. The integer pair $\{16,6\}$ satisfies this norm constraint to within approximately 1%.

The resulting 8 point transform matrix (using the integer coefficients determined in steps 2 and 3) is:

$$T_8 = \begin{bmatrix} 12 & 12 & 12 & 12 & 12 & 12 & 12 & 12 \\ 16 & 15 & 9 & 4 & -4 & -9 & -15 & -16 \\ 16 & 6 & -6 & -16 & -16 & -6 & 6 & 16 \\ 15 & -4 & -16 & -9 & 9 & 16 & 4 & -15 \\ 12 & -12 & -12 & 12 & 12 & -12 & -12 & 12 \\ 9 & -16 & 4 & 15 & -15 & -4 & 16 & -9 \\ 6 & -16 & 16 & -6 & -6 & 16 & -16 & 6 \\ 4 & -9 & 15 & -16 & 16 & -15 & 9 & -4 \end{bmatrix}$$

A fourth step 640 of the construction process 600 generates the four point transform. For the 8-point transform generated as discussed above (steps 610-630), the constant multiplier of the DC basis function is $d_8=12$. The constant multiplier for the 4-point transfer therefore is $d_4=17$. For a DCT-like basis, this leaves the coefficients, $D_1$ and $D_2$, in the following basis functions to be generated:

$$\begin{bmatrix} 17 & 17 & 17 & 17 \\ D1 & D2 & -D2 & -D1 \\ 17 & -17 & -17 & 17 \\ D2 & -D1 & D1 & -D2 \end{bmatrix}$$

The matrix with the above basis functions is inherently orthogonal for any choice of $D_1$ and $D_2$. However, in accordance with the DCT-like transform constraint, the coefficients are related by the DCT twiddle factor (i.e., the ratio $D_1/D_2$) being equal to $\sqrt{2}+1$. Further, the coefficients are subject to the norm constraint, $D1^2+D2^2 \approx 578$. A pair of integers that satisfy the orthogonality, DCT-like basis, and the norm constraint to within approximately 1% is the integer pair $\{22, 10\}$. This yields the following basis functions for the four point transform:

$$T_4 = \begin{bmatrix} 17 & 17 & 17 & 17 \\ 22 & 10 & -10 & -22 \\ 17 & -17 & -17 & 17 \\ 10 & -22 & 22 & -10 \end{bmatrix}$$

V. Transform Implementation (Continued)

Returning to FIG. 5, the transform matrices generated using the construction process 600 above essentially define the transforms. For a two-dimensional transform, the basis functions are applied in each dimension to the sample data block. In the illustrated transform implementation 500, the basis functions are applied to rows of the sample data block in pre-multiplication 510, then to columns of the sample data block in post-multiplication 530. Because the transform is constructed to be orthogonal, the identical transform matrices are used for the forward 300 and inverse 310 transforms. With the transform basis functions having non-unitary norms, the illustrated implementation also includes scaling stages 520 and 540 at the inverse transform to compensate range expansion introduced by the transforms. Such range-limited implementation also can be used for the forward transform, but in the context of video coding, the range-limiting on the forward transform is often redundant. Since the encoding process is slower than decoding and the available computational resources at the encoder is often an order of magnitude higher than that at the decoder, the encoder may be implemented in higher precision (e.g., 32 bit) integer or even double precision floating point. Accordingly, the following discussion first considers an exemplary implementation of the inverse transform using the transform matrices described above.

Inverse Transform Implementation.

In the transform implementation 500 as described previously, the rows of the transform domain data block (which we denote as D in the following discussion) are inverse transformed in the pre-multiplication stage 510 by performing a matrix multiplication with the appropriate size transform matrix (e.g., the matrix $T_8$ above for an 8×8 data block). The columns of the transform domain data block are inverse transformed in the post-multiplication stage 530 by matrix multiplication also with the transform matrix. This ordering can be reversed, but likely would result in a mismatch. The transform matrix for the pre-multiplication and post-multiplication stages is the transform matrix constructed as described above.

For the scaling stages 520 and 540, the scaling in the exemplary transform implementation is determined subject to the scaled integer implementation constraint discussed above (i.e., scaling is by a power of two to facilitate computation on standard system and graphics processors). Accordingly, the scaling is chosen to be the power of 2 closest to the squared norm of the basis functions of the transform matrix.

More specifically, the canonical formula for the inverse transformation can be represented as follows:

$$R = \frac{(T_8' \cdot D \cdot T_8)}{s}$$

where D denotes the transform-domain data block at the input (A) to the inverse transform. In the following discussion, $D_1$ represents the data block output from the first multiplication stage 510 of the transform implementation 500, and R represents the reconstructed output after row and column wise inverse transformation. The denominator s is the scaling factor. D, $D_1$, and R are isomorphic 8×8, 8×4 or 4×8 matrices. In an abuse of notation, operations involving a matrix and a scalar are entry-wise operations on the matrix. Likewise, scalar operations with a matrix argument are entry-wise scalar operations on the matrix.

The denominator, s, is chosen to be the power of 2 closest to the squared norm of the basis functions. For the 8×8 inverse transform, the values of the squared norms of the one-dimensional 8-point basis functions are {1152, 1156, 1168}. The denominator therefore is chosen to be 1024 (i.e., s=1024), which is the power of 2 that is closest to these squared norm values. Since the ratio between the actual norms and this denominator (i.e., norms/s≈0.12) is close to 1, there is close correspondence between the quantization parameter used for the standard IDCT and that used for the illustrated transform implementation. There is no additional error introduced here since all remaining normalization (essentially by 1024/squared norm of basis function) is performed in the forward transform process described below.

As per the discussion of the range constraint above, the transform-domain data block D at the input of the inverse transform has a range of 12 bits in the illustrated implementation. (Due to the normalization, the range of the transform domain data block produced from the forward transform is actually reduced to ±2048/1.12.) The canonical intermediate matrix (after inverse transformation in one dimension) is $$D_1 = \frac{(D \cdot T_8)}{32}$$

and has a range of slightly below 10.5 bits.

In one inverse transform implementation 500, the scaling stages 520 and 540 can each round down or shift the data block values by 5 bit places (effectively, a division by 32), which together shifts by 10 bit places (for division by 1024). This maintains the range constraints at the multiplication stages 510 and 530 within a 16 bit range.

An alternative implementation preserves arithmetic precision for the second, post-multiplication stage, by reducing the amount of scaling or rounding at the first scaling stage 520. Since the result data block $D_1$ after the first multiplication stage uses a range of 10.5 bits, and the 8-point transform expands the range by 4 bits, at most 1 bit less of scaling can be permitted at the first scaling stage to remain within the 16 bit range constraint at both multiplication stages. The alternative implementation therefore can shift by 4-bits at the first scaling stage 520, and by 6 bits at the second scaling stage 540. The canonical representation of the transformation is now:

$$D_1 = \frac{(D \cdot T_8)}{16}$$

$$R = \frac{(T_8' \cdot D_1)}{64}$$

This alternative implementation permits an additional bit of precision to be retained at $D_1$. This same scaling can be used for the 4-point transform, because the largest multiplier in the 4-point transform matrix is still within the available headroom (4.5 bits), although barely so.

For retaining a second additional bit of precision at the intermediate data block $D_1$, a further alternative implementation decomposes the transform matrix as:

$$T_8 = 2 \cdot T_8^e + T_8^o$$

$$T_4 = 2 \cdot T_4^e + T_4^o$$

Here, the odd component matrices $T_8^o$ and $T_4^o$ are only permitted to have 0, 1 and −1 as entries. Since most of the entries of $T_8$ are even, $T_8^e$ is a sparse matrix. Likewise, $T_4^o$ has a structure highly correlated with $T_4^e$. The canonical representation of this further alternative inverse transform implementation is now defined as $$D_1 = \frac{(D \cdot T_8)}{8}$$

$$R = \frac{\left(T_8'^e \cdot D_1 + \frac{T_8'^o \cdot D_1}{2}\right)}{64}$$

The first scaling stage 520 now shifts down by only 3 bits, retaining extra precision for the second multiplication stage 530. Since the even component has half the range of $T_8$, and since the odd component $T_8^o$ is limited to have 0, 1 and −1 entries, the resulting numerator in the second stage of transform is range limited to 16 bits. There is a minor computational penalty to pay for the extra bit of precision at $D_1$. Nevertheless, this decomposition of the transformation matrix results in improved arithmetic precision at negligible cost.

In other alternative implementations, the transform T can be more generally decomposed into component transform matrices $T_a$ and $T_b$, which are related to the transform basis T as $T = 2^x \cdot T_a + T_b$. The calculation of the transform, $$D_1 = \frac{D \cdot T}{2^y},$$

can then be defined as, $$R = \frac{\left(D \cdot T_a + \frac{D \cdot T_b}{2^x}\right)}{2^{y-x}}$$

This calculation can be implemented using matrix multiplication and shift operations, as follows:

$(D \cdot T_a + ((D \cdot T_b) >> x)) >> (y-x)$.

Returning to the particular alternative implementation of the transform $T_8$, the odd and even components of the 8-point transform are shown below:

$$T_8^e = \begin{bmatrix} 6 & 6 & 6 & 6 & 6 & 6 & 6 & 6 \\ 8 & 7 & 4 & 2 & -2 & -4 & -7 & -8 \\ 8 & 3 & -3 & -8 & -8 & -3 & 3 & 8 \\ 7 & -2 & -8 & -5 & 5 & 8 & 2 & -7 \\ 6 & -6 & -6 & 6 & 6 & -6 & -6 & 6 \\ 4 & -8 & 2 & 7 & -7 & -2 & 8 & -4 \\ 3 & -8 & 8 & -3 & -3 & 8 & -8 & 3 \\ 2 & -5 & 7 & -8 & 8 & -7 & 5 & -2 \end{bmatrix}$$

$$T_8^o = \begin{bmatrix} 0 & 0 & 0 & 0 & 0 & 0 & 0 & 0 \\ 0 & 1 & 1 & 0 & 0 & -1 & -1 & 0 \\ 0 & 0 & 0 & 0 & 0 & 0 & 0 & 0 \\ 1 & 0 & 0 & 1 & -1 & 0 & 0 & -1 \\ 0 & 0 & 0 & 0 & 0 & 0 & 0 & 0 \\ 1 & 0 & 0 & 1 & -1 & 0 & 0 & -1 \\ 0 & 0 & 0 & 0 & 0 & 0 & 0 & 0 \\ 0 & 1 & 1 & 0 & 0 & -1 & -1 & 0 \end{bmatrix}$$

Note that $T_8^o$ has only two independent nonzero columns. Postmultiplication by $T_8^o$ is tantamount to merely two additions (and negations):

$W \cdot T_8^o = [W_1\ W_2\ W_2\ W_1\ -W_1\ -W_2\ -W_2\ -W_1]$ where $$[W_1\ W_2] = W \cdot \begin{bmatrix} 0 & 0 \\ 0 & 1 \\ 0 & 0 \\ 1 & 0 \\ 0 & 0 \\ 1 & 0 \\ 0 & 0 \\ 0 & 1 \end{bmatrix}$$

The even and odd components of the 4 point inverse transform are:

$$T_4^e = \begin{bmatrix} 8 & 8 & 8 & 8 \\ 11 & 5 & -5 & -11 \\ 8 & -8 & -8 & 8 \\ 5 & -11 & 11 & -5 \end{bmatrix}$$

$$T_4^o = \begin{bmatrix} 1 & 1 & 1 & 1 \\ 0 & 0 & 0 & 0 \\ 1 & -1 & -1 & 1 \\ 0 & 0 & 0 & 0 \end{bmatrix}$$

In this further alternative implementation, the row-wise or pre-multiplication stage 510 and first scaling stage 520 for the 8×8 inverse transform perform the following operation:

$D_1 = (D \cdot T_8 + 4) >> 3$

The column-wise or post-multiplication stage 530 and scaling stage 540 in this inverse transform implementation is defined first by looking at the odd component of $T_8$ to compute the two common rows of 8 elements. These are right-shifted by one bit and then added to (or subtracted from) the even component product, before the result is rounded down by 6 bits. The operations performed in these stages therefore are represented as follows:

$$[D_{1a}\ D_{1b}] = D_1' \cdot \begin{bmatrix} 0 & 0 \\ 0 & 1 \\ 0 & 0 \\ 1 & 0 \\ 0 & 0 \\ 1 & 0 \\ 0 & 0 \\ 0 & 1 \end{bmatrix}$$

$D_{2a} = D_{1a} \gg 1$ $D_{2b} = D_{1b} \gg 1$ $$R = \left( T_8'^e \cdot D_1 + \begin{bmatrix} D_{2a} \\ D_{2b} \\ D_{2b} \\ D_{2a} \\ -D_{2a} \\ -D_{2b} \\ -D_{2b} \\ -D_{2a} \end{bmatrix} + 32 \right) \gg 6$ For the 4×8 inverse transform in the further alternative implementation (which according to the convention used herein refers to an array with 4 columns and 8 rows), the row-wise or pre-multiplication stage 510 and scaling stage 520 performs a 4 point operation defined as $$D_1 = (D \cdot T_4 + 4) >> 3$$

For the second part of the transform, the column-wise or post-multiplication stage 530 and scaling stage 540 is identical to that for the 8×8 inverse transform just described.

For the 8×4 inverse transform, the further alternative implementation operates on the 4 rows/8 columns transform domain data in the row-wise stage 510 and scaling stage 520 according to $$D_1 = (D \cdot T_8 + 4) >> 3$$

The 4 point inverse transform for the column-wise stage 530 and scaling stage 540 is defined below:

$$[D_{1a} \ D_{1b}] = D'_1 \cdot \begin{bmatrix} 1 & 1 \\ 0 & 0 \\ 1 & -1 \\ 0 & 0 \end{bmatrix}$$

$$D_{2a} = D_{1a} \gg 1$$

$$D_{2b} = D_{1b} \gg 1$$

$$R = \left( T_4'^e \cdot D_1 + \begin{bmatrix} D_{2a} \\ D_{2b} \\ -D_{2b} \\ -D_{2a} \end{bmatrix} + 32 \right) \gg 6$$

For the 4×4 inverse transform, the stages 510, 530 of the 4×4 inverse transform are implemented as described above for the row-wise stage 510 of the 4×8 inverse transform and the column-wise stage 530 of the 8×4 inverse transform, respectively.

Forward Transform Implementation.

Range-limited implementations, such as illustrated in FIG. 5 including scaling stages, may be applied to the forward transform as well, but in the context of video coding such a procedure is often redundant. Since the encoding process is slower than decoding and the available computational resource at the encoder is often an order of magnitude higher than that at the decoder, the encoder may be implemented in higher precision (e.g. 32 bit) integer or even double precision floating point. In other words, the scaling stages 520, 540 in the forward transform implementation can be omitted.

Figure 8:
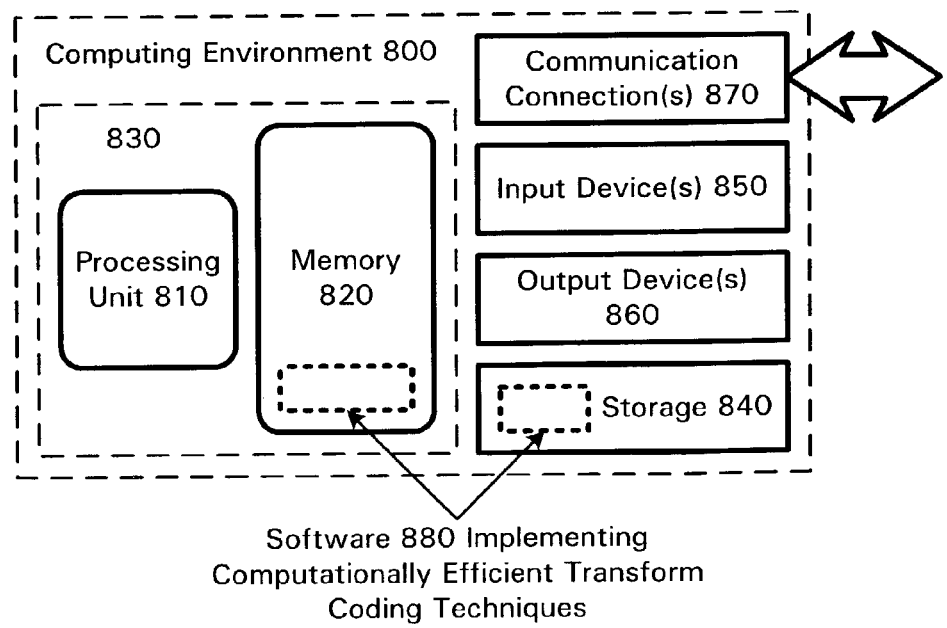
FIG. 8 is a block diagram of a suitable computing environment for the video encoder/decoder based on the described class of transform of FIGS. 1 and 2.

In a preferred forward transform implementation shown in FIG. 8, a renormalization stage 740 is performed on the forward transform side (after row-wise and column-wise multiplication 710 and 730) to ensure that the transforms themselves introduce minimal amount of error in reconstruction. This compensates the slight difference in norms of the basis functions, and reduces the computational burden at the decoder where fewer computational resources may be available. Alternatively for systems having sufficient computational resources provided at the decoder, the compensation (scaling of transform data) can be performed at the decoder.

In the following discussion, the symbol ⊗ denotes component-wise product of equal-sized matrices. The original 2-D signal (sample data block) is denoted X and its transform is Y($X_1$ denotes the intermediate block after row-wise transform). The matrices X and Y are of the same size, and cover the 8×8, 8×4 and 4×8 cases. The following scaling factors are used:

$$f_0 = \frac{64}{288 \times 288}$$

$$f_1 = \frac{64}{288 \times 289}$$

$$f_2 = \frac{64}{289 \times 289}$$

$$f_3 = \frac{64}{288 \times 292}$$

$$f_4 = \frac{64}{289 \times 292}$$

$$f_5 = \frac{64}{292 \times 292}$$

For the 8×8 forward transform, the processing in stages 710, 730 and 740 is described as follows:

$$Y = (T_8 \cdot X \cdot T'_8) \otimes \begin{bmatrix} f_0 & f_1 & f_3 & f_1 & f_0 & f_1 & f_3 & f_1 \\ f_1 & f_2 & f_4 & f_2 & f_1 & f_2 & f_4 & f_2 \\ f_3 & f_4 & f_5 & f_4 & f_3 & f_4 & f_5 & f_4 \\ f_1 & f_2 & f_4 & f_2 & f_1 & f_2 & f_4 & f_2 \\ f_0 & f_1 & f_3 & f_1 & f_0 & f_1 & f_3 & f_1 \\ f_1 & f_2 & f_4 & f_2 & f_1 & f_2 & f_4 & f_2 \\ f_3 & f_4 & f_5 & f_4 & f_3 & f_4 & f_5 & f_4 \\ f_1 & f_2 & f_4 & f_2 & f_1 & f_2 & f_4 & f_2 \end{bmatrix}$$

For the 4×8 forward transform, the stages perform the following:

$$Y = (T_8 \cdot X \cdot T'_4) \otimes \begin{bmatrix} f_1 & f_3 & f_1 & f_3 \\ f_2 & f_4 & f_2 & f_4 \\ f_4 & f_5 & f_4 & f_5 \\ f_2 & f_4 & f_2 & f_4 \\ f_1 & f_3 & f_1 & f_3 \\ f_2 & f_4 & f_2 & f_4 \\ f_4 & f_5 & f_4 & f_5 \\ f_2 & f_4 & f_2 & f_4 \end{bmatrix}$$

The 8×4 forward transform, on the other hand, is the transpose of the 4×8 forward transform above.

The 4×4 forward transform implements scaling as follows:

$$Y = (T_4 \cdot X \cdot T'_4) \otimes \begin{bmatrix} f_2 & f_4 & f_2 & f_4 \\ f_4 & f_5 & f_4 & f_5 \\ f_2 & f_4 & f_2 & f_4 \\ f_4 & f_5 & f_4 & f_5 \end{bmatrix}$$

VI. Suitable Computing Environment

The above described transforms can be performed on any of a variety of devices in which image and video signal processing is performed, including among other examples, computers; image and video recording, transmission and receiving equipment; portable video players; video conferencing; and etc. The image and video coding techniques can be implemented in hardware circuitry, as well as in image and video processing software executing within a computer or other computing environment, such as shown in FIG. 8.

FIG. 8 illustrates a generalized example of a suitable computing environment (800) in which described embodiments may be implemented. The computing environment (800) is not intended to suggest any limitation as to scope of use or functionality of the invention, as the present invention may be implemented in diverse general-purpose or special-purpose computing environments.

With reference to FIG. 8, the computing environment (800) includes at least one processing unit (810) and memory (820). In FIG. 8, this most basic configuration (830) is included within a dashed line. The processing unit (810) executes computer-executable instructions and may be a real or a virtual processor. In a multi-processing system, multiple processing units execute computer-executable instructions to increase processing power. The memory (820) may be volatile memory (e.g., registers, cache, RAM), non-volatile memory (e.g., ROM, EEPROM, flash memory, etc.), or some combination of the two. The memory (820) stores software (880) implementing the described image and/or video encoder/decoder and transforms.

A computing environment may have additional features. For example, the computing environment (800) includes storage (840), one or more input devices (850), one or more output devices (860), and one or more communication connections (870). An interconnection mechanism (not shown) such as a bus, controller, or network interconnects the components of the computing environment (800). Typically, operating system software (not shown) provides an operating environment for other software executing in the computing environment (800), and coordinates activities of the components of the computing environment (800).

The storage (840) may be removable or non-removable, and includes magnetic disks, magnetic tapes or cassettes, CD-ROMs, CD-RWs, DVDs, or any other medium which can be used to store information and which can be accessed within the computing environment (800). The storage (840) stores instructions for the software (880) implementing the audio encoder that that generates and compresses quantization matrices.

The input device(s) (850) may be a touch input device such as a keyboard, mouse, pen, or trackball, a voice input device, a scanning device, or another device that provides input to the computing environment (800). For audio, the input device(s) (850) may be a sound card or similar device that accepts audio input in analog or digital form, or a CD-ROM reader that provides audio samples to the computing environment. The output device(s) (860) may be a display, printer, speaker, CD-writer, or another device that provides output from the computing environment (800).

The communication connection(s) (870) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The transform and coding/decoding techniques herein can be described in the general context of computer-readable media. Computer-readable media are any available media that can be accessed within a computing environment. By way of example, and not limitation, with the computing environment (800), computer-readable media include memory (820), storage (840), communication media, and combinations of any of the above.

The transform and coding/decoding techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

VII. Extensions

The above-described transforms and their implementations can be extended in a variety of ways, including as follows:

Variants of the transform implementations can include alternate rounding, "butterfly" implementation, and biorthogonal formulations.

Further, the construction process described above can be followed subject to different bit-range constraints to generate transform variants having a different coefficient range.

The threshold parameters of the constraints used in the construction procedure can be varied to yield a larger set of complaint transforms.

The transform set can be extended to include further block sizes (e.g., the 4×4 and other block size transform). Likewise, the transform set generated may not necessarily include the sizes in the implementation illustrated above (i.e., the 8×8, 8×4 and 4×8 transforms). The transform may be extended to other size blocks, and higher (>2) dimensions.

The choice of bit depth is a variable parameter, and can be changed arbitrarily for the illustrated example (with 8-bit resolution of raw pixel values and 16-bits for intermediate results).

The implementation of the forward transform also can be range-limited, such as by using the procedure described for range-limiting the inverse transform implementation.

The construction process described above can be followed to generate transforms which approximate other non-DCT basis functions. For example, the construction process can generate transforms that approximate FFT, wavelets, or other overlapped transforms, while satisfying the constraints on scaled integers, perfect reconstruction and range limitation.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

While the transform-coding techniques are described in places herein as part of a single, integrated system, the techniques can be applied separately, potentially in combination with other techniques. In alternative embodiments, a signal processing tool other than an encoder or decoder implements one or more of the techniques.

The described transforms and transform-coding embodiments perform various techniques. Although the operations for these techniques are typically described in a particular, sequential order for the sake of presentation, it should be understood that this manner of description encompasses minor rearrangements in the order of operations, unless a particular ordering is required. For example, operations described sequentially may in some cases be rearranged or performed concurrently. Moreover, for the sake of simplicity, flowcharts typically do not show the various ways in which particular techniques can be used in conjunction with other techniques.

In view of the many possible embodiments to which the principles of our invention may be applied, we claim as our invention all such embodiments as may come within the scope and spirit of the following claims and equivalents thereto.

We claim:

1. A method of encoding media data, comprising:
for a two dimensional block of the media data, performing a forward transform of the block to convert the block into a transform domain,
quantizing the transform-domain block;
dequantizing the transform-domain block; and
performing an inverse transform of the transform-domain block to produce a reconstructed block, the inverse transform being implemented as a sequence of matrix multiplications by a transform matrix composed of integer numbers conforming within a predetermined tolerance to certain constraints, the constraints comprising a scaled integer constraint, a perfect reconstruction constraint, a DCT-like basis constraint, and an integer range limitation constraint, wherein the constraints also comprise a constraint that basis functions of the transform are close in norm, and a constraint that there be sufficient headroom.

2. The method of claim 1 further comprising compensating for any mismatch in basis function norms at quantization.

3. The method of claim 1 further comprising compensating for any mismatch in basis function norms at dequantization.

4. The method of claim 1 further comprising compensating for any mismatch in basis function norms partly at quantization and partly at dequantization.

5. A media system providing transform coding of a media data, comprising:
a forward transform stage operating, for a two dimensional block of the media data, to perform a forward transform of the block to convert the block into a transform domain,
a quantization stage operating to quantize the transform-domain block;
a dequantization stage operating to dequantize the transform-domain block; and
an inverse transform stage for performing an inverse transform of the transform-domain block to produce a reconstructed block, the inverse transform being implemented as a sequence of matrix multiplications by a transform matrix composed of integer numbers conforming within a predetermined tolerance to certain constraints, the constraints comprising a scaled integer constraint, a perfect reconstruction constraint, a DCT-like basis constraint, and an integer range limitation constraint, wherein the constraints also comprise a constraint that basis functions of the transform are close in norm, and a constraint that there be sufficient headroom.

6. A computer readable storage medium having a computer-executable program instructions stored thereon operative upon execution on a computer system to perform a method of encoding media data, comprising:
for a two dimensional block of the media data, performing a forward transform of the block to convert the block into a transform domain,
quantizing the transform-domain block;
dequantizing the transform-domain block; and
performing an inverse transform of the transform-domain block to produce a reconstructed block, the inverse transform being implemented as a sequence of matrix multiplications by a transform matrix composed of integer numbers conforming within a predetermined tolerance to certain constraints, the constraints comprising a scaled integer constraint, a perfect reconstruction constraint, a DCT-like basis constraint, and an integer range limitation constraint, wherein the constraints also comprise a constraint that basis functions of the transform are close in norm, and a constraint that there be sufficient headroom.

7. A method of decoding media data encoded as a block of quantized, transform domain values comprising:
dequantizing the transform-domain block; and
performing an inverse transform of the transform-domain block to produce a reconstructed block, the inverse transform being implemented as a sequence of matrix multiplications by a transform matrix composed of integer numbers conforming within a predetermined tolerance to certain constraints, the constraints comprising a scaled integer constraint, a perfect reconstruction constraint, a DCT-like basis constraint, and an integer range limitation constraint, wherein the constraints also comprise a close norms constraint and a sufficient headroom constraint.

8. The method of claim 7 wherein the encoded media data block is norm mismatch compensated at quantization.

9. The method of claim 7 further comprising compensating for any mismatch in basis function norms of the transform at dequantization.

10. The method of claim 7 further comprising compensating for any mismatch in basis function norms of the transform partly at quantization and partly at dequantization.

11. A media decoder for decoding data encoded as a block of quantized, transform domain values, comprising:
a dequantization stage for dequantizing the transform-domain block; and
an inverse transform stage for performing an inverse transform of the transform-domain block to produce a reconstructed block, the inverse transform being implemented as a sequence of matrix multiplications by a transform matrix composed of integer numbers conforming within a predetermined tolerance to certain constraints, the constraints comprising a scaled integer constraint, a perfect reconstruction constraint, a DCT-like basis constraint, and an integer range limitation constraint, wherein the constraints also comprise a close norms constraint and a sufficient headroom constraint.

12. A computer readable storage medium having computer-executable program instructions stored thereon operative upon execution on a computer system to perform a method of decoding media data encoded as a block of quantized, transform domain values, comprising:

dequantizing the transform-domain block; and performing an inverse transform of the transform-domain block to produce a reconstructed block, the inverse transform being implemented as a sequence of matrix multiplications by a transform matrix composed of integer numbers conforming within a predetermined tolerance to certain constraints, the constraints comprising a scaled integer constraint, a perfect reconstruction constraint, a DCT-like basis constraint, and an integer range limitation constraint, wherein the constraints also comprise a close norms constraint and a sufficient headroom constraint.

13. A method of converting a two-dimensional block of image data between spatial and transform domain representations, where at least one dimension of the block is 8 points, comprising:

performing at least one matrix multiplication of the image data block with a transform matrix composed of integer transform coefficients in the form, $$T_8 = \begin{bmatrix} 12 & 12 & 12 & 12 & 12 & 12 & 12 & 12 \\ 16 & 15 & 9 & 4 & -4 & -9 & -15 & -16 \\ 16 & 6 & -6 & -16 & -16 & -6 & 6 & 16 \\ 15 & -4 & -16 & -9 & 9 & 16 & 4 & -15 \\ 12 & -12 & -12 & 12 & 12 & -12 & -12 & 12 \\ 9 & -16 & 4 & 15 & -15 & -4 & 16 & -9 \\ 6 & -16 & 16 & -6 & -6 & 16 & -16 & 6 \\ 4 & -9 & 15 & -16 & 16 & -15 & 9 & -4 \end{bmatrix} ; \text{and}$$

scaling the resulting matrix product to remain within a bit-range limit;

wherein the image data block is an 8×8 block and the performing at least one matrix multiplication comprises performing row-wise and column-wise matrix multiplications of the image data block with the transform matrix, and wherein the scaling comprises an entry-wise shift operation after each of the row-wise and column-wise matrix multiplications to effect division by a power of two.

14. The method of claim 13 wherein the entry-wise shift operation after a first of the matrix multiplications is a shift by fewer bit positions than after a second of the matrix multiplications.

15. The method of claim 13 wherein the entry-wise shift operations are shifts by an equal number of bit positions after each of the matrix multiplications.

16. A computer readable storage medium having computer executable program instructions stored thereon for execution on a computer to perform a method of converting a two-dimensional block of image data between spatial and transform domain representations, where at least one dimension of the block is 8 points, comprising:

performing at least one matrix multiplication of the image data block with a transform matrix composed of integer transform coefficients in the form, $$T_8 = \begin{bmatrix} 12 & 12 & 12 & 12 & 12 & 12 & 12 & 12 \\ 16 & 15 & 9 & 4 & -4 & -9 & -15 & -16 \\ 16 & 6 & -6 & -16 & -16 & -6 & 6 & 16 \\ 15 & -4 & -16 & -9 & 9 & 16 & 4 & -15 \\ 12 & -12 & -12 & 12 & 12 & -12 & -12 & 12 \\ 9 & -16 & 4 & 15 & -15 & -4 & 16 & -9 \\ 6 & -16 & 16 & -6 & -6 & 16 & -16 & 6 \\ 4 & -9 & 15 & -16 & 16 & -15 & 9 & -4 \end{bmatrix} ; \text{and}$$

scaling the resulting matrix product to remain within a bit-range limit;

wherein the image data block is an 8×8 block and the performing at least one matrix multiplication comprises performing row-wise and column-wise matrix multiplications of the image data block with the transform matrix, and wherein the scaling comprises an entry-wise shift operation after each of the row-wise and column-wise matrix multiplications to effect division by a power of two.

17. A method of converting a two-dimensional block of image data between spatial and transform domain representations, where at least one dimension of the block is 4 points, comprising:

performing at least one matrix multiplication of the image data block with a transform matrix composed of integer transform coefficient in the form, $$T_4 = \begin{bmatrix} 17 & 17 & 17 & 17 \\ 22 & 10 & -10 & -22 \\ 17 & -17 & -17 & 17 \\ 10 & -22 & 22 & -10 \end{bmatrix} ; \text{and}$$

scaling the resulting matrix product to remain within a bit-range limit;

wherein the image data block is an 4×4 block and the performing at least one matrix multiplication comprises performing row-wise and column-wise matrix multiplications of the image data block with the transform matrix, and wherein the scaling comprises an entry-wise shift operation after each of the row-wise and column-wise matrix multiplications to effect division by a power of two.

18. The method of claim 17 wherein the entry-wise shift operation after a first of the matrix multiplications is a shift by fewer bit positions than after a second of the matrix multiplications.

19. The method of claim 17 wherein the entry-wise shift operations are shifts by an equal number of bit positions after each of the matrix multiplications.

20. A computer readable storage medium having computer-executable program instructions stored thereon for execution on computer system to perform a method of converting a two-dimensional block of image data between spatial and transform domain representations, where at least one dimension of the block is 4 points, comprising:

performing at least one matrix multiplication of the image data block with a transform matrix composed of integer transform coefficients in the form, $$T_4 = \begin{bmatrix} 17 & 17 & 17 & 17 \\ 22 & 10 & -10 & -22 \\ 17 & 17 & -17 & 17 \\ 10 & -22 & 22 & -10 \end{bmatrix}; \text{and}$$

scaling the resulting matrix product to remain within a bit-range limit;

wherein the image data block is an 4×4 block and the performing at least one matrix multiplication comprises performing row-wise and column-wise matrix multiplications of the image data block with the transform matrix, and wherein the scaling composes an entry-wise shift operation after each of the row-wise and column-wise matrix multiplications to effect division by a power of two.

21. A computer readable storage medium having computer-executable program instructions stored thereon for execution on computer system to perform a method of converting a two-dimensional block of image data between spatial and transform domain representations, where dimensions of the block are 4 and 8 points, the method comprising:

performing row-wise and column-wise matrix multiplications of the image data block with transform matrices composed of integer transform coefficients in the form, $$T_8 = \begin{bmatrix} 12 & 12 & 12 & 12 & 12 & 12 & 12 & 12 \\ 16 & 15 & 9 & 4 & -4 & -9 & -15 & -16 \\ 16 & 6 & -6 & -16 & -16 & -6 & 6 & 16 \\ 15 & -4 & -16 & -9 & 9 & 16 & 4 & -15 \\ 12 & -12 & -12 & 12 & 12 & -12 & -12 & 12 \\ 9 & -16 & 4 & 15 & -15 & -4 & 16 & -9 \\ 6 & -16 & 16 & -6 & -6 & 16 & -16 & 6 \\ 4 & -9 & 15 & -16 & 16 & -15 & 9 & -4 \end{bmatrix} \text{and}$$

$$T_4 = \begin{bmatrix} 17 & 17 & 17 & 17 \\ 22 & 10 & -10 & -22 \\ 17 & -17 & -17 & 17 \\ 10 & -22 & 22 & -10 \end{bmatrix}; \text{and}$$

scaling the resulting matrix product to remain within a bit-range limit;

wherein the data block has dimensions of 4×8 points, and the act of performing the matrix multiplications is performed according to the relation, $Y=(T_8 \cdot X \cdot T'_4)$, where X represents the data block and Y is the resulting matrix product.

22. A method of converting a two-dimensional block of image data between spatial and transform domain representations, where dimensions of the block are 4 and 8 points, the method comprising:

performing row-wise and column-wise matrix multiplications of the image data block with transform matrices composed of interger transform coefficients in form, $$T_8 = \begin{bmatrix} 12 & 12 & 12 & 12 & 12 & 12 & 12 & 12 \\ 16 & 15 & 9 & 4 & -4 & -9 & -15 & -16 \\ 16 & 6 & -6 & -16 & -16 & -6 & 6 & 16 \\ 15 & -4 & -16 & -9 & 9 & 16 & 4 & -15 \\ 12 & -12 & -12 & 12 & 12 & -12 & -12 & 12 \\ 9 & -16 & 4 & 15 & -15 & -4 & 16 & -9 \\ 6 & -16 & 16 & -6 & -6 & 16 & -16 & 6 \\ 4 & -9 & 15 & -16 & 16 & -15 & 9 & -4 \end{bmatrix} \text{and}$$

$$T_4 = \begin{bmatrix} 17 & 17 & 17 & 17 \\ 22 & 10 & -10 & -22 \\ 17 & -17 & -17 & 17 \\ 10 & -22 & 22 & -10 \end{bmatrix}; \text{and}$$

scaling the resulting matrix product to remain within a bit-range limit;

wherein the data block has dimensions of 4×8 points, and the act of performing the matrix multiplications is performed according to the relation, $Y=(T_8 \cdot X \cdot T'_4)$, where X represents the data block and Y is the resulting matrix product.

23. A method of converting a two-dimensional block of image data between spatial and transform domain representations, where dimensions of the block are 4 and 8 points, the method comprising:

performing row-wise and column-wise matrix multiplications of the image data block with transform matrices composed of integer transform coefficients in the form, $$T_8 = \begin{bmatrix} 12 & 12 & 12 & 12 & 12 & 12 & 12 & 12 \\ 16 & 15 & 9 & 4 & -4 & -9 & -15 & -16 \\ 16 & 6 & -6 & -16 & -16 & -6 & 6 & 16 \\ 15 & -4 & -16 & -9 & 9 & 16 & 4 & -15 \\ 12 & -12 & -12 & 12 & 12 & -12 & -12 & 12 \\ 9 & -16 & 4 & 15 & -15 & -4 & 16 & -9 \\ 6 & -16 & 16 & -6 & -6 & 16 & -16 & 6 \\ 4 & -9 & 15 & -16 & 16 & -15 & 9 & -4 \end{bmatrix} \text{and}$$

$$T_4 = \begin{bmatrix} 17 & 17 & 17 & 17 \\ 22 & 10 & -10 & -22 \\ 17 & -17 & -17 & 17 \\ 10 & -22 & 22 & -10 \end{bmatrix}; \text{and}$$

scaling the resulting matrix product to remain within a bit-range limit;

wherein the data block has dimensions of 8×4 points, and the act of performing the matrix multiplications is performed according to the relation, $Y=(T_4 \cdot X \cdot T'_8)$, where X represents the data block and Y is the resulting matrix product.

24. A computer readable storage medium having computer-executable program instructions stored thereon for execution on computer system to perform a method of converting a two-dimensional block of image data between spatial and transform domain representations, where dimensions of the block are 4 and 8 points, the method comprising:

performing row-wise and column-wise matrix multiplications of the image data block with transform matrices composed of integer transform coefficients in the form, $$T_8 = \begin{bmatrix} 12 & 12 & 12 & 12 & 12 & 12 & 12 & 12 \\ 16 & 15 & 9 & 4 & -4 & -9 & -15 & -16 \\ 16 & 6 & -6 & -16 & -16 & -6 & 6 & 16 \\ 15 & -4 & -16 & -9 & 9 & 16 & 4 & -15 \\ 12 & -12 & -12 & 12 & 12 & -12 & -12 & 12 \\ 9 & -16 & 4 & 15 & -15 & -4 & 16 & -9 \\ 6 & -16 & 16 & -6 & -6 & 16 & -16 & 6 \\ 4 & -9 & 15 & -16 & 16 & -15 & 9 & -4 \end{bmatrix} \text{ and}$$

$$T_4 = \begin{bmatrix} 17 & 17 & 17 & 17 \\ 22 & 10 & -10 & -22 \\ 17 & -17 & -17 & 17 \\ 10 & -22 & 22 & -10 \end{bmatrix}; \text{ and}$$

scaling the resulting matrix product to remain within a bit-range limit;
wherein the data block has dimensions of 8×4 points, and the act of performing the matrix multiplications is performed according to the relation, $Y = (T_4 \cdot X \cdot T'_8)$, where X represents the data block and Y is the resulting matrix product.

25. A method of transform coding a data block representing media content, comprising:
applying a transform to the data block to produce a transform domain data block representing the media content, the transform comprising a set of transform basis functions having mismatching, yet approximately equal norms; and
sealing values in the transform domain data block according to scaling factors for the respective transform basis functions to compensate for the mismatching norms;
wherein applying the transform comprises a matrix multiplication using a matrix, $$T_8 = \begin{bmatrix} 12 & 12 & 12 & 12 & 12 & 12 & 12 & 12 \\ 16 & 15 & 9 & 4 & -4 & -9 & -15 & -16 \\ 16 & 6 & -6 & -16 & -16 & -6 & 6 & 16 \\ 15 & -4 & -16 & -9 & 9 & 16 & 4 & -15 \\ 12 & -12 & -12 & 12 & 12 & -12 & -12 & 12 \\ 9 & -16 & 4 & 15 & -15 & -4 & 16 & -9 \\ 6 & -16 & 16 & -6 & -6 & 16 & -16 & 6 \\ 4 & -9 & 15 & -16 & 16 & -15 & 9 & -4 \end{bmatrix}; \text{ and}$$

wherein scaling comprises performing a component-wise product using a matrix, $$\begin{bmatrix} f_0 & f_1 & f_3 & f_1 & f_0 & f_1 & f_3 & f_1 \\ f_1 & f_2 & f_4 & f_2 & f_1 & f_2 & f_4 & f_2 \\ f_3 & f_4 & f_5 & f_4 & f_3 & f_4 & f_5 & f_4 \\ f_1 & f_2 & f_4 & f_2 & f_1 & f_2 & f_4 & f_2 \\ f_0 & f_1 & f_3 & f_1 & f_0 & f_1 & f_3 & f_1 \\ f_1 & f_2 & f_4 & f_2 & f_1 & f_2 & f_4 & f_2 \\ f_3 & f_4 & f_5 & f_4 & f_3 & f_4 & f_5 & f_4 \\ f_1 & f_2 & f_4 & f_2 & f_1 & f_2 & f_4 & f_2 \end{bmatrix}$$

where, $$f_0 = \frac{64}{288 \times 288}$$
$$f_1 = \frac{64}{288 \times 289}$$
$$f_2 = \frac{64}{289 \times 289}$$
$$f_3 = \frac{64}{288 \times 292}$$
$$f_4 = \frac{64}{289 \times 292}$$
$$f_5 = \frac{64}{292 \times 292}.$$

26. The method of claim 25 wherein scaling to compensate for the mismatching norms is performed at encoding, so as to reduce computational load at decoding.

27. A method of transform coding a data block representing media content, comprising:
applying a transform to the data block to produce a transform domain data block representing the media content, the transform comprising a set of transform basis functions having mismatching, yet approximately equal norms; and
scaling values in the transform domain data block according to scaling factor for the respective transform basis functions to compensate for the mismatching norms;
wherein applying the transform comprises a matrix multiplication using a matrix, $$T_8 = \begin{bmatrix} 12 & 12 & 12 & 12 & 12 & 12 & 12 & 12 \\ 16 & 15 & 9 & 4 & -4 & -9 & -15 & -16 \\ 16 & 6 & -6 & -16 & -16 & -6 & 6 & 16 \\ 15 & -4 & -16 & -9 & 9 & 16 & 4 & -15 \\ 12 & -12 & -12 & 12 & 12 & -12 & -12 & 12 \\ 9 & -16 & 4 & 15 & -15 & -4 & 16 & -9 \\ 6 & -16 & 16 & -6 & -6 & 16 & -16 & 6 \\ 4 & -9 & 15 & -16 & 16 & -15 & 9 & -4 \end{bmatrix} \text{ and}$$

$$T_4 = \begin{bmatrix} 17 & 17 & 17 & 17 \\ 22 & 10 & -10 & -22 \\ 17 & -17 & -17 & 17 \\ 10 & -22 & 22 & -10 \end{bmatrix}; \text{ and}$$

wherein scaling comprises calculating a component-wise product using a matrix, $$\begin{bmatrix} f_1 & f_3 & f_1 & f_3 \\ f_2 & f_4 & f_2 & f_4 \\ f_4 & f_5 & f_4 & f_5 \\ f_2 & f_4 & f_2 & f_4 \\ f_1 & f_3 & f_1 & f_3 \\ f_2 & f_4 & f_2 & f_4 \\ f_4 & f_5 & f_4 & f_5 \\ f_2 & f_4 & f_2 & f_4 \end{bmatrix} \text{ where}$$

$$f_0 = \frac{64}{288 \times 288}$$
$$f_1 = \frac{64}{288 \times 289}$$
$$f_2 = \frac{64}{289 \times 289}$$
$$f_3 = \frac{64}{288 \times 292}$$
$$f_4 = \frac{64}{289 \times 292}$$
$$f_5 = \frac{64}{292 \times 292}.$$

28. The method of claim 27 wherein scaling to compensate for the mismatching norms is performed at decoding, so as to reduce computational load at encoding.

29. A method of transform coding a data block representing media content, comprising:

applying a transform to the data block to produce a transform domain data block representing the media content, the transform comprising a set of transform basis functions having mismatching, yet approximately equal norms; and scaling values in the transform domain data block according to scaling factors for the respective transform basis functions to compensate for the mismatching norms;

wherein applying the transform comprises matrix multiplications using matrices, $$T_4 = \begin{bmatrix} 17 & 17 & 17 & 17 \\ 22 & 10 & -10 & -22 \\ 17 & -17 & -17 & 17 \\ 10 & -22 & 22 & -10 \end{bmatrix}; \text{ and}$$

wherein scaling comprises calculating a component-wise product using a matrix, $$\begin{bmatrix} f_2 & f_4 & f_2 & f_4 \\ f_4 & f_5 & f_4 & f_5 \\ f_2 & f_4 & f_2 & f_4 \\ f_4 & f_5 & f_4 & f_5 \end{bmatrix} \text{ where } \begin{aligned} f_2 &= \frac{64}{289 \times 289} \\ f_4 &= \frac{64}{289 \times 292} \\ f_5 &= \frac{64}{292 \times 292} \end{aligned}.$$

30. A computer-readable storage medium having computer-executable program instructions stored thereon for executing on a computer system to perform a method of transform coding a data block representing media content, comprising:

applying a transform to the data block to produce a transform domain data block representing the media content, the transform comprising a set of transform basis functions having mismatching, yet approximately equal norms; and scaling values in the transform domain data block according to scaling factors for the respective transform basis functions to compensate for the mismatching norms;

wherein applying the transform comprises a matrix multiplication using a matrix, $$T_8 = \begin{bmatrix} 12 & 12 & 12 & 12 & 12 & 12 & 12 & 12 \\ 16 & 15 & 9 & 4 & -4 & -9 & -15 & -16 \\ 16 & 6 & -6 & -16 & -16 & -6 & 6 & 16 \\ 15 & -4 & -16 & -9 & 9 & 16 & 4 & -15 \\ 12 & -12 & -12 & 12 & 12 & -12 & -12 & 12 \\ 9 & -16 & 4 & 15 & -15 & -4 & 16 & -9 \\ 6 & -16 & 16 & -6 & -6 & 16 & -16 & 6 \\ 4 & -9 & 15 & -16 & 16 & -15 & 9 & -4 \end{bmatrix}; \text{ and}$$

wherein scaling comprises performing a component-wise product using a matrix, $$\begin{bmatrix} f_0 & f_1 & f_3 & f_1 & f_0 & f_1 & f_3 & f_1 \\ f_1 & f_2 & f_4 & f_2 & f_1 & f_2 & f_4 & f_2 \\ f_3 & f_4 & f_5 & f_4 & f_3 & f_4 & f_5 & f_4 \\ f_1 & f_2 & f_4 & f_2 & f_1 & f_2 & f_4 & f_2 \\ f_0 & f_1 & f_3 & f_1 & f_0 & f_1 & f_3 & f_1 \\ f_1 & f_2 & f_4 & f_2 & f_1 & f_2 & f_4 & f_2 \\ f_3 & f_4 & f_5 & f_4 & f_3 & f_4 & f_5 & f_4 \\ f_1 & f_2 & f_4 & f_2 & f_1 & f_2 & f_4 & f_2 \end{bmatrix}$$

where, $$f_0 = \frac{64}{288 \times 288}$$
$$f_1 = \frac{64}{288 \times 289}$$
$$f_2 = \frac{64}{289 \times 289}$$
$$f_3 = \frac{64}{288 \times 292}$$
$$f_4 = \frac{64}{289 \times 292}$$
$$f_5 = \frac{64}{292 \times 292}.$$

31. A method of transform coding a data block, D, representing media content, comprising:

calculating a transform of the data block for convening between spatial and transform domain representations of the media block, wherein a result R of the transform is related to the data block D as $$R = \frac{D \cdot T}{2^y}$$

where T is a matrix of transform basis functions, the calculating comprising:

performing matrix multiplications of the data block with each of first and second transform sub-component matrices, wherein the transform sub-component matrices ($T_a$ and $T_b$) are related to the transform basis function matrix as $T = 2^x \cdot T_a + T_b$;

shifting a product of the data block and second sub-component matrix by x bit positions;

summing a product of the data block and first sub-component matrix with the shifted product of the data block and second sub-component matrix; and shifting a sum of the products by y bit positions to produce the result R;

whereby the headroom of the transform is extended.

32. The method of claim 31 wherein the transform basis function matrix is $$T_8 = \begin{bmatrix} 12 & 12 & 12 & 12 & 12 & 12 & 12 & 12 \\ 16 & 15 & 9 & 4 & -4 & -9 & -15 & -16 \\ 16 & 6 & -6 & -16 & -16 & -6 & 6 & 16 \\ 15 & -4 & -16 & -9 & 9 & 16 & 4 & -15 \\ 12 & -12 & -12 & 12 & 12 & -12 & -12 & 12 \\ 9 & -16 & 4 & 15 & -15 & -4 & 16 & -9 \\ 6 & -16 & 16 & -6 & -6 & 16 & -16 & 6 \\ 4 & -9 & 15 & -16 & 16 & -15 & 9 & -4 \end{bmatrix}; \text{ and}$$

wherein the transform sub-component matrices are $$T_8^e = \begin{bmatrix} 6 & 6 & 6 & 6 & 6 & 6 & 6 & 6 \\ 8 & 7 & 4 & 2 & -2 & -4 & -7 & -8 \\ 8 & 3 & -3 & -8 & -8 & -3 & 3 & 8 \\ 7 & -2 & -8 & -5 & 5 & 8 & 2 & -7 \\ 6 & -6 & -6 & 6 & 6 & -6 & -6 & 6 \\ 4 & -8 & 2 & 7 & -7 & -2 & 8 & -4 \\ 3 & -8 & 8 & -3 & -3 & 8 & -8 & 3 \\ 2 & -5 & 7 & -8 & 8 & -7 & 5 & -2 \end{bmatrix}$$

$$T_8^o = \begin{bmatrix} 0 & 0 & 0 & 0 & 0 & 0 & 0 & 0 \\ 0 & 1 & 1 & 0 & 0 & -1 & -1 & 0 \\ 0 & 0 & 0 & 0 & 0 & 0 & 0 & 0 \\ 1 & 0 & 0 & 1 & -1 & 0 & 0 & -1 \\ 0 & 0 & 0 & 0 & 0 & 0 & 0 & 0 \\ 1 & 0 & 0 & 1 & -1 & 0 & 0 & -1 \\ 0 & 0 & 0 & 0 & 0 & 0 & 0 & 0 \\ 0 & 1 & 1 & 0 & 0 & -1 & -1 & 0 \end{bmatrix}.$$

33. The method of claim 31 wherein the transform basis function matrix is $$T_4 = \begin{bmatrix} 17 & 17 & 17 & 17 \\ 22 & 10 & -10 & -22 \\ 17 & -17 & -17 & 17 \\ 10 & -22 & 22 & -10 \end{bmatrix}; \text{ and}$$

wherein the transform sub-component matrices are $$T_4^e = \begin{bmatrix} 8 & 8 & 8 & 8 \\ 11 & 5 & -5 & -11 \\ 8 & -8 & -8 & 8 \\ 5 & -11 & 11 & -5 \end{bmatrix}$$

$$T_4^o = \begin{bmatrix} 1 & 1 & 1 & 1 \\ 0 & 0 & 0 & 0 \\ 1 & -1 & -1 & 1 \\ 0 & 0 & 0 & 0 \end{bmatrix}.$$

34. A computer-readable storage medium having computer-executable program instructions stored thereon for execution on a computer system to perform a method of transform coding a data block, D, representing media content, comprising:

calculating a transform of the data block for converting between spatial and transform domain representations of the media block, wherein a result R of the transform is related to the data block D as $$R = \frac{D \cdot T}{2^y}$$

where T is a matrix of transform basis functions, the calculating comprising:

performing matrix multiplications of the data block with each of first and second transform sub-component matrices, wherein the transform sub-component matrices ($T_a$ and $T_b$) are related to the transform basis function matrix as $T=2^x \cdot T_a + T_b$;

shifting a product of the data block and second sub-component matrix by x bit positions;

summing a product of the data block and first sub-component matrix with the shifted product of the data block and second sub-component matrix; and shifting a sum of the products by y bit positions to produce the result R;

whereby the headroom of the transform is extended.

* * * * *